US008520783B2

(12) United States Patent
Umeda

(10) Patent No.: US 8,520,783 B2
(45) Date of Patent: Aug. 27, 2013

(54) RECEIVING DEVICE

(75) Inventor: Masataka Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 13/046,290

(22) Filed: Mar. 11, 2011

(65) Prior Publication Data

US 2011/0235688 A1    Sep. 29, 2011

(30) Foreign Application Priority Data

Mar. 26, 2010 (JP) ................................ 2010-073765
Sep. 24, 2010 (JP) ................................ 2010-214560

(51) Int. Cl.
*H04L 27/06* (2006.01)

(52) U.S. Cl.
USPC ........... 375/340; 375/316; 375/219; 375/349; 375/346; 375/348; 375/347; 455/296

(58) Field of Classification Search
USPC ................. 375/340, 316, 219, 349, 346, 348, 375/347; 455/296
See application file for complete search history.

(56) References Cited

U.S. PATENT DOCUMENTS

2009/0221254 A1*  9/2009  Kawauchi et al. ............ 455/296

FOREIGN PATENT DOCUMENTS

JP    2007-288450 A    11/2007
JP    2008-72224 A      3/2008

OTHER PUBLICATIONS

"Transmission System for Digital Terrestrial Television Broadcasting ARIB STD-B31", Association of Radio Industries and Businesses, 2001, pp. 1-172.

* cited by examiner

*Primary Examiner* — Zewdu Kassa
(74) *Attorney, Agent, or Firm* — Arent Fox LLP

(57) ABSTRACT

A receiving device includes: a receiver that receives frequency multiplex signal; a first Fourier transformation unit that transforms the received frequency multiplex signal to frequency domain signal; a first time-domain waveform generator that generates a first time-domain waveform by performing inverse Fourier transformation of a plurality of pilot signals which are inserted into the frequency multiplex signal; a second time-domain waveform generator that generates a second time-domain waveform having an aliasing period on the basis of the received frequency multiplex signal; a second Fourier transformation unit that synthesizes the first time-domain waveform to the second time-domain waveform and transforms the synthesized time-domain waveform to frequency-domain information; and a propagation-path compensation unit that compensates a propagation-path of the frequency multiplex signal which is output from the first Fourier transformation unit in accordance with information transformed by the second Fourier transformation unit.

12 Claims, 24 Drawing Sheets

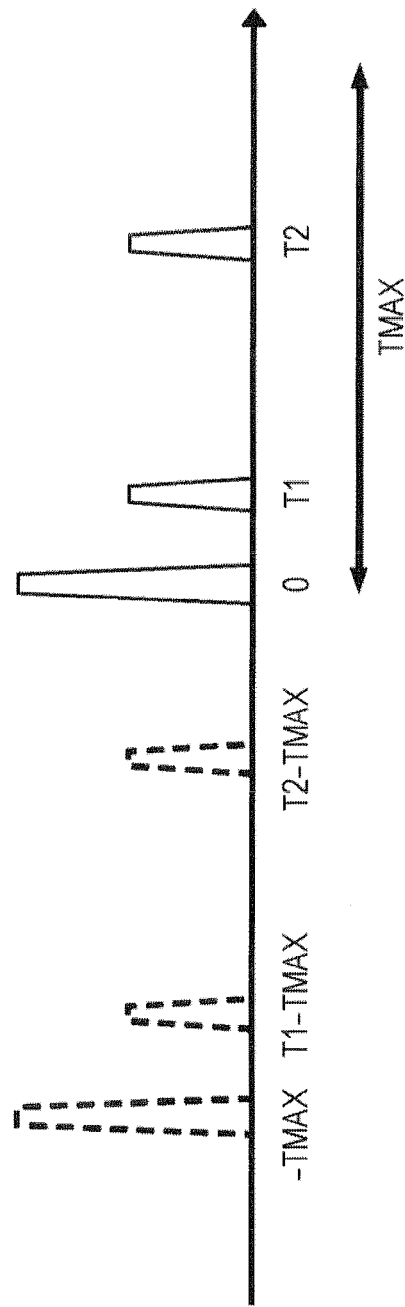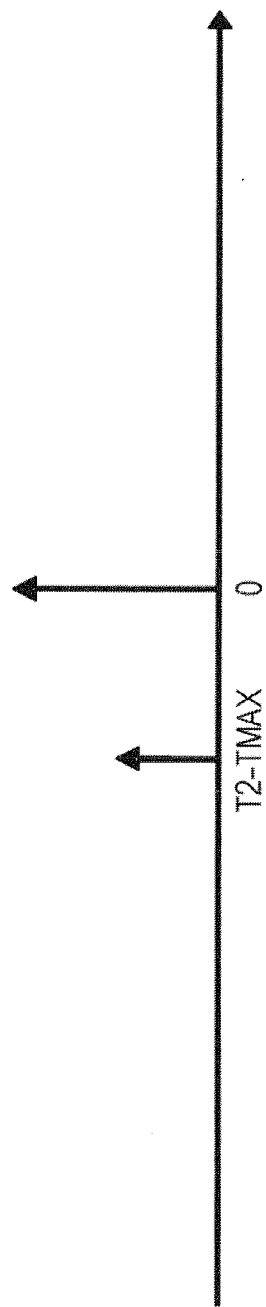

FIG. 16

| EMBODIMENT | EXISTING EXAMPLE | EMBODIMENT 1 | | EMBODIMENT 2 |
|---|---|---|---|---|
| | 110 | 111 | 112 | 113 |
| PILOT INTERVAL | K=3 | K=3 | K=12 | MIXED |
| MAXIMUM ANALYSIS RANGE (usec) | 336 | 336 | 84 | 336 |
| TIME RESOLUTION (usec) | 0.656 | 0.656 | 0.164 | 0.164 |
| NUMBER OF CORRELATION UNITS | 1 | 2N | 8N | 2N |
| NUMBER OF TAPS/CORRELATION UNIT | 4096 | 4 | 1 | 1 |
| TOTAL NUMBER OF TAPS | 4096 | 8N | 8N | 2N |

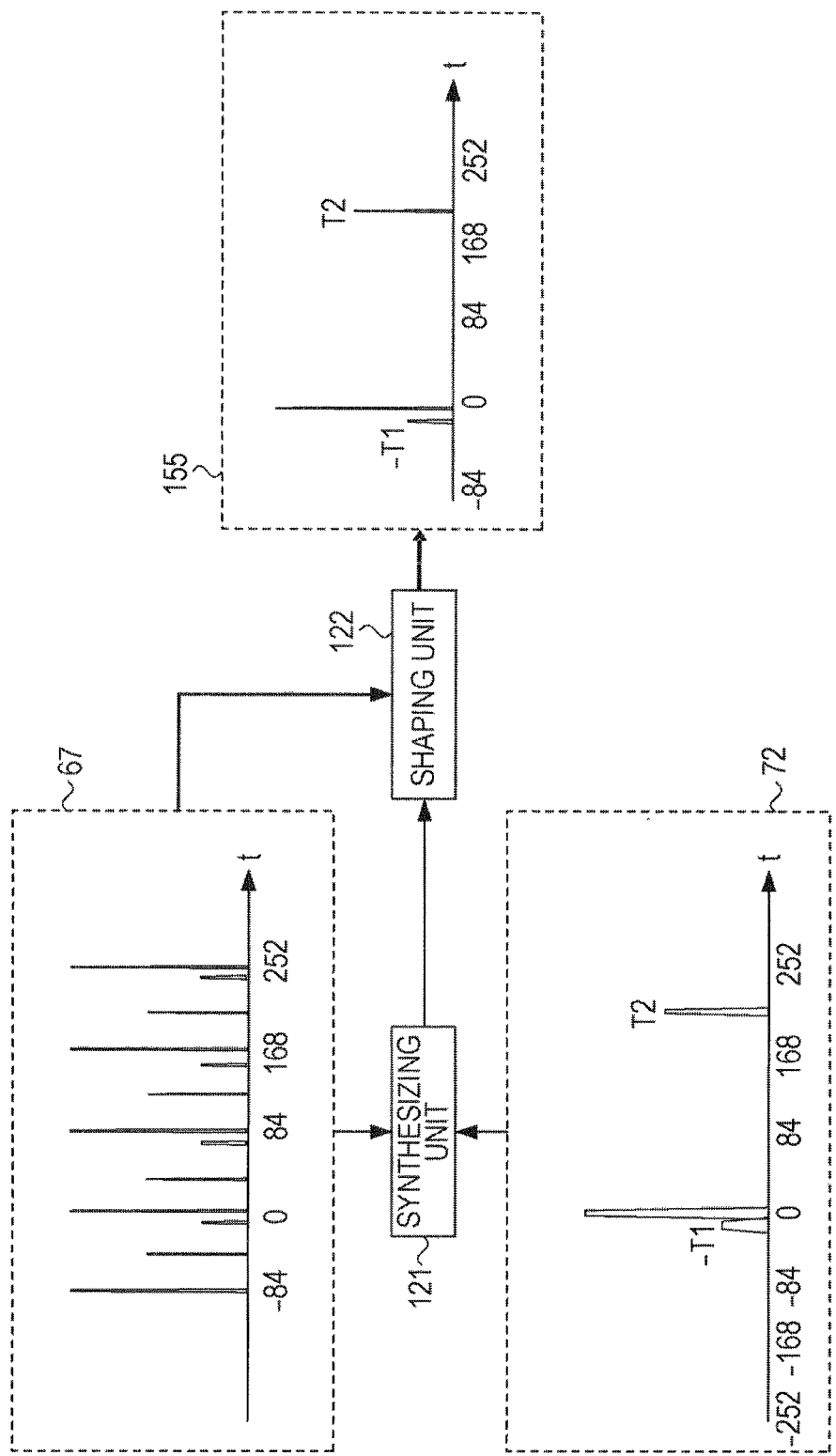

RECEIVING DEVICE

CROSS-REFERENCE TO RELATED APPLICATION

This application is based upon and claims the benefit of priority of the prior Japanese Patent Application No. 2010-214560 filed on Sep. 24, 2010 and Japanese Patent Application No. 2010-073765 filed on Mar. 26, 2010, the entire contents of which are incorporated herein by reference.

FIELD

The embodiments discussed herein are related to a receiving device that receives a frequency multiplex signal.

BACKGROUND

In the fields of radio communication, digital broadcasting and the like, various multiplexing techniques are used in order to effectively utilize a limited transmission band. As one of the multiplexing techniques, a system which is called an Orthogonal Frequency Division Multiplexing (OFDM) system is proposed. In the OFDM system, many orthogonal sub-carriers are provided in a transmission frequency band and pieces of data are allocated to the amplitude and the phase of each sub-carrier to perform digital modulation.

In the case that an OFDM signal, that is, a frequency multiplexing signal which has been sent from a base station is radio-received, the OFDM signal which has been sent from the base station strikes an obstacle such as a building or a topological obstacle and is reflected and diffracted. A receiving device receives OFDM signals which have been sent passing through a plurality of paths generated by signal reflection and diffraction. The plurality of paths generated by signal reflection and diffraction are generally called a multipath. Distances over which the respective OFDM signals are propagated through the multipath are different from one another. Owing to a difference in propagated distance among the signals, the receiving device receives the plurality of OFDM signals which are different from one another in amplitude and phase.

In the case that an OFDM signal is influenced by the multipath, the amplitudes and phases of sub-carriers in the OFDM signal are changed. In order to eliminate the influence of the multipath on each sub-carrier, the receiving device performs a path estimating process to estimate the characteristic of a propagation path through which a received signal is propagated. In performing the path estimating process, the receiving device uses pilot signals which have been inserted into the OFDM signal. The pilot signal has the previously defined amplitude and phase. The receiving device compares a received pilot signal with the pilot signal having the previously defined amplitude and phase to estimate the characteristic of the propagation path. The receiving device performs an equalizing process on a received signal on the basis of a result of path estimation performed.

The receiving device performs the path estimating process on the basis of a time-domain waveform signal obtained by performing Inverse Fast Fourier Transform (IFFT) processing on a plurality of pilot signals which have been inserted into the OFDM signal at fixed frequency intervals. A maximum analysis range which the path estimating process is allowed is limited by the frequency intervals of the pilot signals.

In addition, the receiving device is allowed to perform the path estimating process by calculating an autocorrelation of the received signal by using a correlation unit such as a matched filter or the like. The receiving device is allowed to increase the path estimable range and the accuracy in path estimation by combining a result of path estimation performed on the basis of the pilot signals with a result of path estimation performed on the basis of autocorrelation arithmetic processing. In addition, the receiving device is allowed to estimate the characteristic of the propagation path which is the frequency domain by performing Fourier transformation on the result of path estimation to transform the received signal to a frequency signal and then is allowed to perform propagation path compensation to compensate for the received signal on the basis of the estimated propagation path characteristic. Techniques relating to path estimating processes and propagation path compensation performed on the basis of the result of path estimation performed on the basis of the pilot signals or the result of path estimation performed on the basis of autocorrelation arithmetic processing are disclosed, for example, in Japanese Laid-open Patent Publication No. 2007-288450 and Japanese Laid-open Patent Publication No. 2008-72224. In addition, a technique relating to the mode 3 of ISDB-T which is the standard for digital broadcasting is disclosed, for example, in "TRANSMISSION SYSTEM FOR DIGITAL TERRESTRIAL TELEVISION BROADCASTING ARIB STD-B31", Association of Radio Industries and Businesses, 2001.

SUMMARY

According to an aspect of the embodiment, a receiving device includes: a receiver that receives frequency multiplex signal; a first Fourier transformation unit that transforms the received frequency multiplex signal to frequency domain signal; a first time-domain waveform generator that generates a first time-domain waveform by performing inverse Fourier transformation of a plurality of pilot signals which are inserted into the frequency multiplex signal; a second time-domain waveform generator that generates a second time-domain waveform having an aliasing period on the basis of the received frequency multiplex signal; a second Fourier transformation unit that synthesizes the first time-domain waveform to the second time-domain waveform and transforms the synthesized time-domain waveform to frequency-domain information; and a propagation-path compensation unit that compensates a propagation-path of the frequency multiplex signal which is output from the first Fourier transformation unit in accordance with information transformed by the second Fourier transformation unit.

BRIEF DESCRIPTION OF DRAWINGS

FIG. 9A is a diagram illustrating an example of a result of multipath signal estimation;

FIG. 9B is a diagram illustrating an example of a result of multipath signal estimation;

FIG. 16 is a diagram illustrating an example of a circuit scale reducing effect brought about by an embodiment;

FIG. 24 is a diagram illustrating an example of waveform shaping that a frequency direction interpolation unit performs on time-domain waveform signals.

DESCRIPTION OF EMBODIMENTS

Next, preferred embodiments will be described. Incidentally, combinations of configurations in the respective embodiments are also included in the embodiments of the invention.

Figure 1:
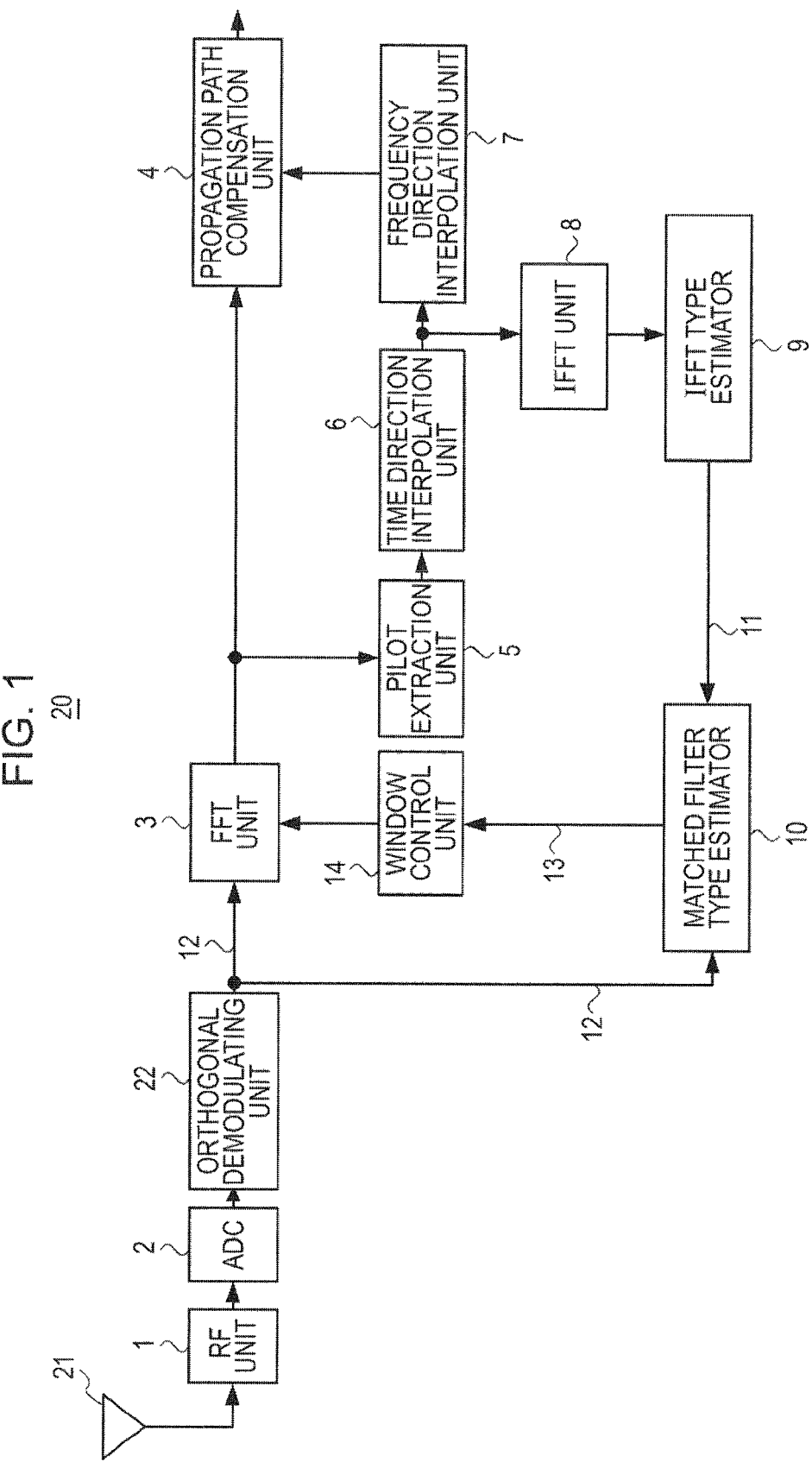
FIG. 1 is a block diagram illustrating an example of a receiving device that receives an OFDM signal.

FIG. 1 is a block diagram illustrating an example of a receiving device 20 that receives an OFDM signal according to a first embodiment. The receiving device 20 according to the first embodiment implements a path estimating process which may be executed in a state in which the circuit scale and the amount of arithmetic processing of a correlation circuit are reduced with no reduction of accuracy in path estimation. High speed path estimation may be executed by reducing the circuit scale and the amount of arithmetic processing of the correlation circuit. The receiving device 10 includes an antenna 21, an RF (Radio Frequency) unit 1, an ADC (Analog to Digital Converter) unit 2, an orthogonal demodulating unit 22, an FFT (Fast Fourier Transform) unit 3, a propagation path compensation unit 4, a pilot extraction unit 5, a time direction interpolation unit 6, a frequency direction interpolation unit 7, an IFFT unit 8, an IFFT type estimator 9, a matched filter type estimator 10, and a window control unit 14.

The receiving device 20 performs fast Fourier transformation (FFT) processing on an OFDM signal which has been received via the antenna 21 in units of OFDM symbols and outputs an OFDM signal which has been converted to a frequency domain signal (a signal which is in a frequency domain). The receiving device 20 adjusts a start position of a window that determines a range over which FFT processing is performed in order to convert the received OFDM signal to the frequency domain signal with accuracy. In addition, the receiving device 20 adjusts a phase shift of the OFDM signal which has been converted to the frequency domain signal in order to increase the accuracy in decoding the signal. Next, details of the receiving device 20 will be described in units of function blocks.

The antenna 21 receives the OFDM signal, that is, the frequency multiplex signal sent from a base station and outputs an RF signal. The RF unit 1 frequency-converts the received RF signal to an IF (Intermediate Frequency) signal. The RF unit 1 performs a filtering process on the frequency-converted IF signal using a band-pass filter or the like to output an IF signal which is in a specific frequency band. The ADC 2 digitizes the received IF signal.

The orthogonal modulation unit 22 orthogonally modulates the digitized IF signal with a carrier signal of a predetermined frequency (a carrier frequency) and outputs an OFDM signal 12 which is in the base band. The OFDM signal 12 is transmitted in units of symbols called OFDM symbols. The OFDM symbol includes an effective symbol which is subjected to IFFT processing when it is sent from the base station and a guard interval obtained by copying the waveform of a part of the latter half of the effective symbol.

The FFT unit 3 performs FFT arithmetic processing on one OFDM signal that has been extracted from one OFDM symbol except the range corresponding to a guard interval. The FFT unit 3 performs FFT arithmetic processing to convert the time domain OFDM signal (the signal which is in the time domain) to the frequency domain OFDM signal. Execution of FFT arithmetic processing is started at a position situated somewhere between the boundary of the OFDM symbols and the position at which the guard interval terminates. A range over which FFT arithmetic processing is performed is called an FFT window. The position at which execution of arithmetic processing on the FFT window is started is controlled using the window control unit q14 which will be described later. Next, the position at which execution of arithmetic processing on the FFT window is started will be described in detail with reference to FIG. 2.

Figure 2:
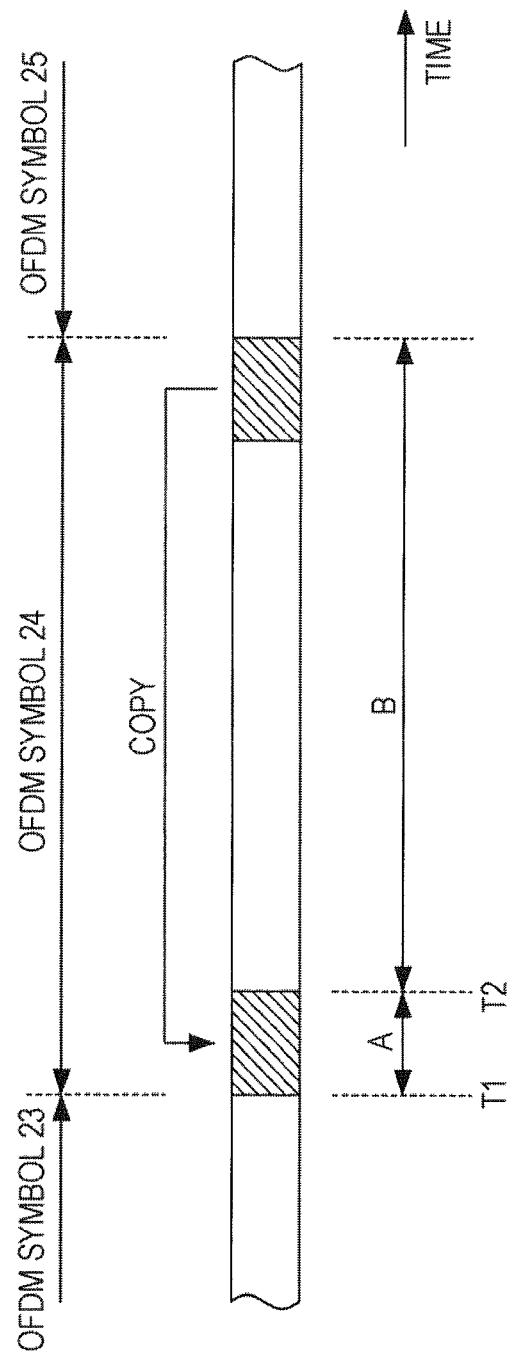
FIG. 2 is a diagram illustrating an example of OFDM symbols included in an OFDM signal which is in a time domain.

FIG. 2 is a diagram illustrating an example of OFDM symbols included in a time domain OFDM signal. OFDM symbols 23, 24 and 25 are part of a plurality of OFDM symbols included in the OFDM signal 12. The OFDM symbol 24 includes a guard interval A and an effective symbol B. The guard interval A is obtained by copying the waveform of part of the latter half of the effective symbol B and inserting it into a part corresponding to the lead of the effective symbol B. The window control unit 14 sets a position at which execution of arithmetic processing on the FFT window is started to one position situated somewhere between a time T1 corresponding to the boundary between the OFDM symbols and a time T2 at which the guard interval A terminates.

Description will be further made returning to explanation of the example illustrated in FIG. 1. The pilot extraction unit 5 extracts pilot signals from within the OFDM signal which has been converted to the frequency domain signal. The pilot signals are existing signals which are inserted into the OFDM signal at fixed frequency intervals and are used for estimation of a propagation path. Next, arrangement of the pilot signals will be described with reference to FIG. 3.

Figure 3:
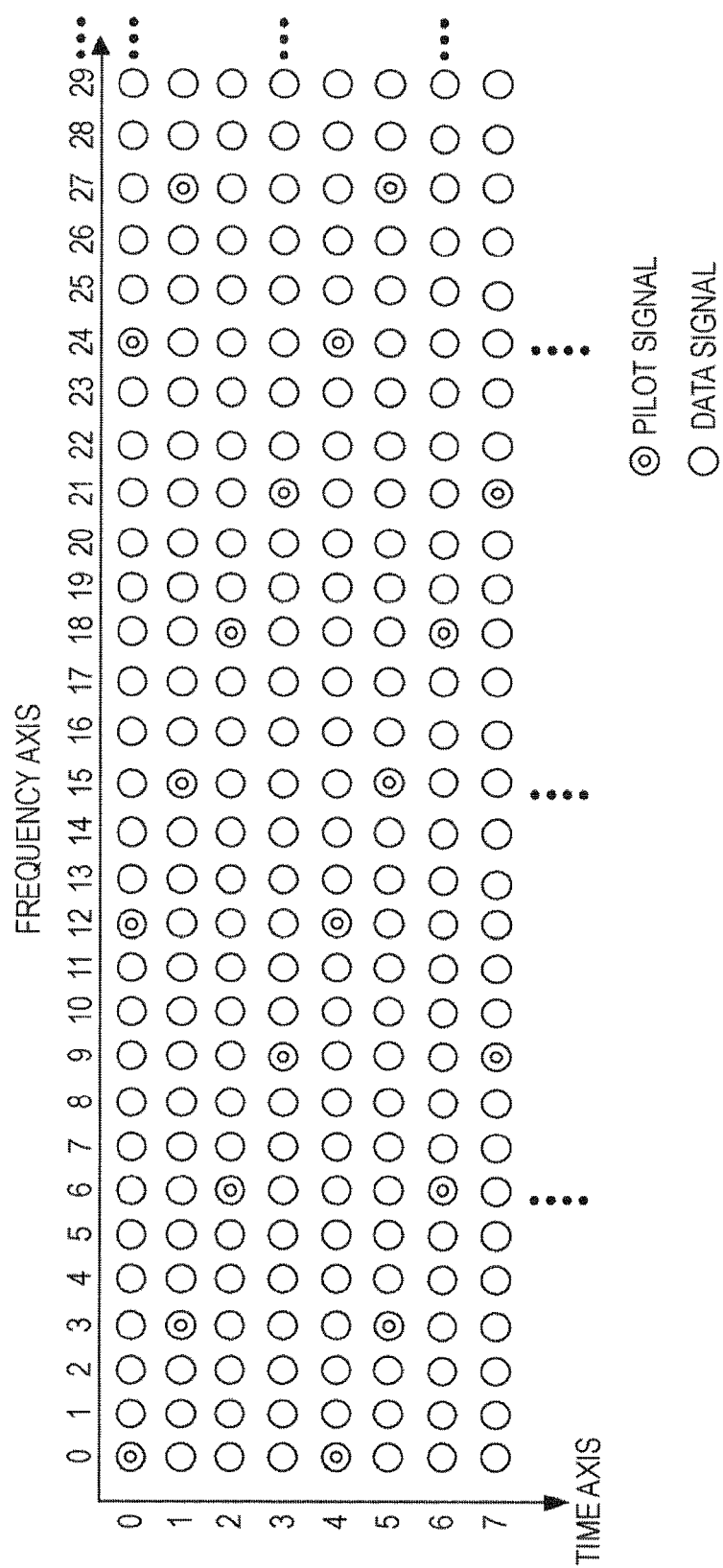
FIG. 3 is a diagram illustrating an example of arrangement of pilot signals.

FIG. 3 is a diagram illustrating an example of arrangement of pilot signals in the first embodiment. FIG. 3 illustrates an example of arrangement of pilot signals conforming to ISDB-T (Integrated Services Digital Broadcasting-Terrestrial) which is the standard of digital broadcasting. Incidentally, the arrangement of pilot signal is not limited to the above mentioned arrangement.

In the example illustrated in FIG. 3, the horizontal axis indicates sub-carriers (a frequency axis) and the vertical axis indicates OFDM's symbols (a time axis). A double circle indicates a pilot signal and a blank circle indicates a data signal. In the first embodiment, each pilot signal is inserted every twelve sub-carriers in a sub-carrier direction and inserted in a state in which it is shifted every three sub-carriers in a symbol direction.

Description will be further made returning to explanation of the example illustrated in FIG. 1. The time direction interpolation unit 6 interpolates the extracted pilot signal in a time axis direction. Objects to be subjected to interpolation arithmetic processing are both a real axis component (an I channel signal) and an imaginary axis component (a Q channel signal) of each pilot signal. Linear interpolation may be used for interpolation arithmetic processing. Next, arrangement of pilot signals and interpolated pilot signals which have been generated by interpolating the pilot signals will be described with reference to FIG. 4.

Figure 4:
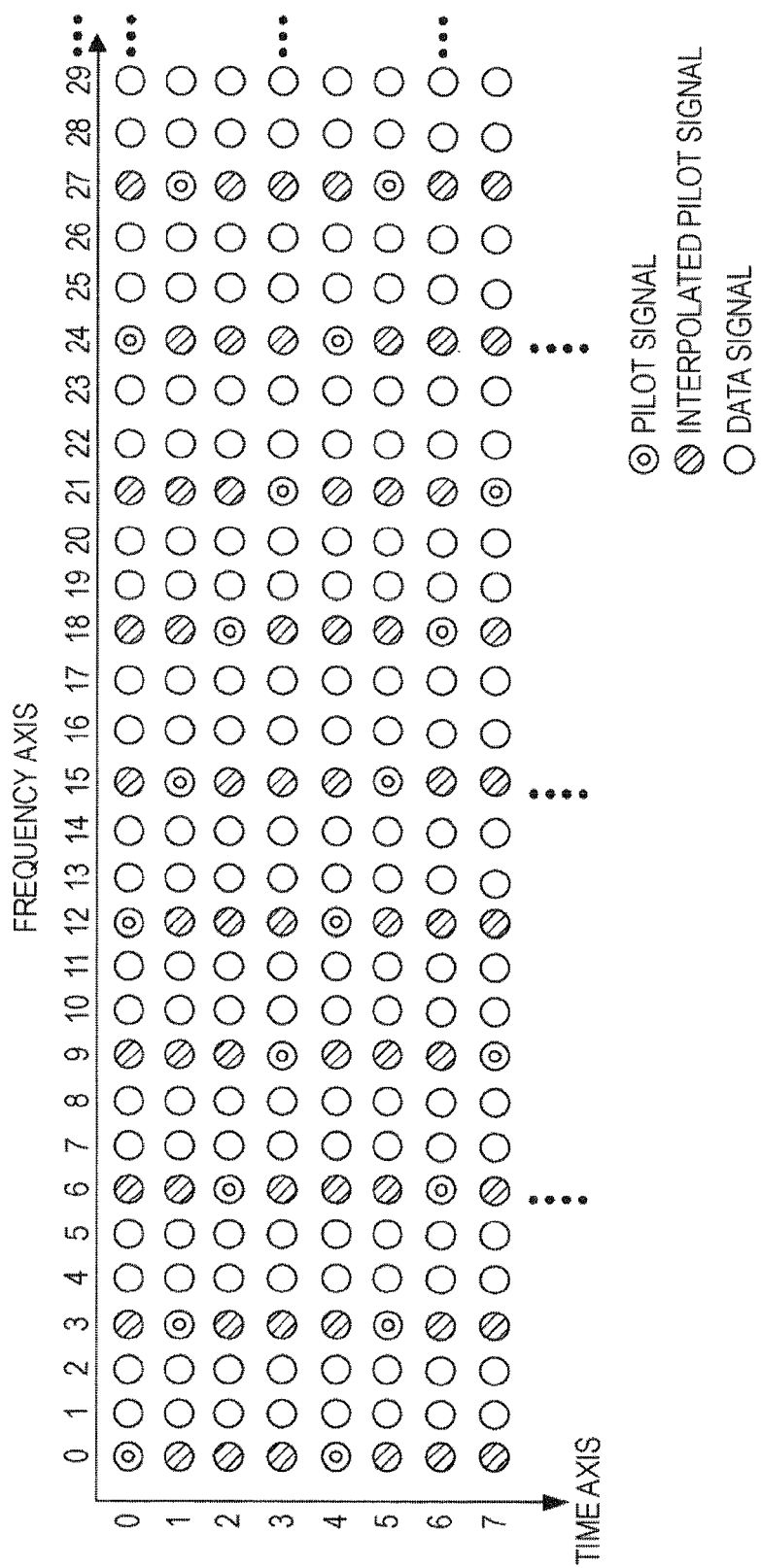
FIG. 4 is a diagram illustrating an example of arrangement of pilot signals and interpolated pilot signals.

FIG. 4 is a diagram illustrating an example of arrangement of pilot signals and interpolated pilot signals. The time direction interpolation unit 6 interpolates each pilot signal illustrated in the arrangement example in FIG. 3 in the time axis direction to generate each interpolated pilot signal illustrated in FIG. 4. A shaded circle indicates an interpolated pilot signal. The pilot signals and the interpolated signals may be referred to every three sub-carriers in all the symbols by interpolating the pilot signals in the time axis direction.

Description will be further made returning to explanation of the example in FIG. 1. The frequency direction interpolation unit 7 further interpolates, in a frequency axis direction, the pilot signals so subjected to interpolation arithmetic processing in the time axis direction. The frequency direction interpolation unit 7 estimates the transmission path characteristic of each sub-carrier in each OFDM symbol on the basis of the pilot signals obtained by execution of interpolation arithmetic processing. Next, arrangement of pilot signals and interpolated pilot signals will be described with reference to FIG. 5.

Figure 5:
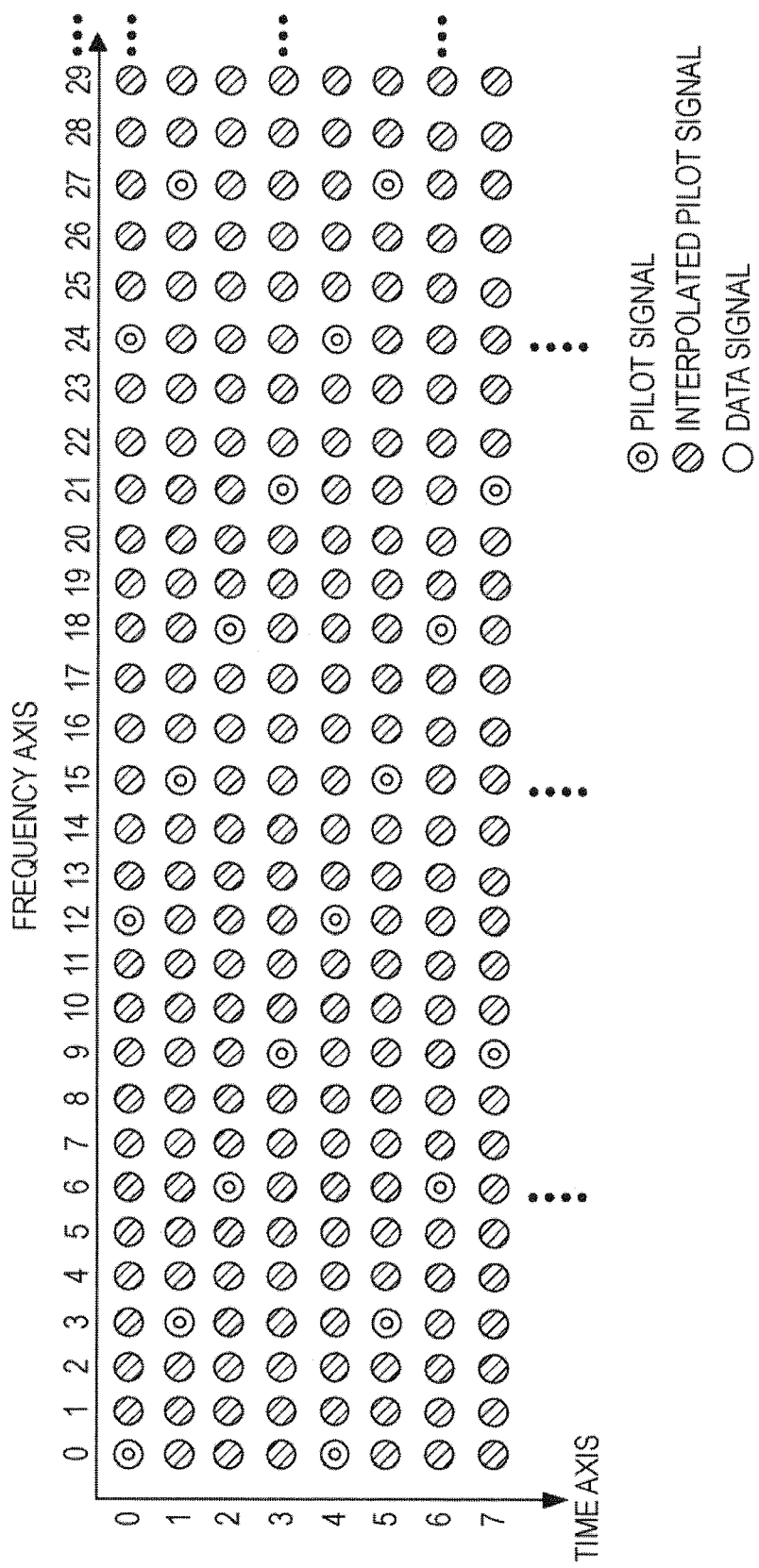
FIG. 5 is a diagram illustrating an example of arrangement of pilot signals and interpolated pilot signals.

FIG. 5 is a diagram illustrating an example of arrangement of pilot signals and interpolated pilot signals. The frequency direction interpolation unit 7 further interpolates the pilot signals and the interpolated pilot signals illustrated in the arrangement example in FIG. 4 in the frequency axis direction. A shaded circle indicates an interpolated pilot signal. The pilot signals of all the sub-carriers in each OFDM symbol may be referred to by being interpolated in the frequency axis direction. As a result, the frequency direction interpolation unit 7 is allowed to estimate transmission path characteristics of all the sub-carriers in each OFDM symbol.

Description will be further made returning to explanation of the example in FIG. 1. The propagation path compensation unit 4 removes a propagation path causing distortion of each OFDM signal which has been converted to the frequency domain signal using the FFT unit 3 on the basis of the transmission path characteristics which have been estimated using the frequency direction interpolation unit 7. The rate of occurrence of data errors in decoding may be reduced by decoding the OFDM signal from which the distortion has been removed using the propagation path compensation unit 4, for example, by using a decoding unit (not illustrated in the drawing).

In addition, the receiving device 20 is allowed to reduce the rate of occurrence of data errors in decoding by appropriately setting a position at which execution of FFT processing on the FFT window is started using the FFT unit 3. Next, appropriate setting of the position at which execution of FFT processing on the FFT window is started using pilot signals will be described.

The IFFT unit 8 performs inverse fast Fourier transformation (IFFT) processing on the frequency domain pilot signals so subjected to interpolation arithmetic processing using the time direction interpolation unit 6 to obtain an impulse response of the transmission path in the time domain. The pilot signals which have been subjected to interpolation arithmetic processing using the time direction interpolation unit 6 are present every three carriers and hence the length of a time range obtained by performing IFFT processing on the pilot signal will be reduced to one-third the length of the effective symbol. Thus, if a delayed wave which is longer than the time range which is one-third the effective symbol length is present in a group of signals as multipath signal candidates (candidates for a multipath signal), aliasing (folding) will occur. Next, an aliasing phenomenon will be described with reference to FIG. 6.

Figure 6:
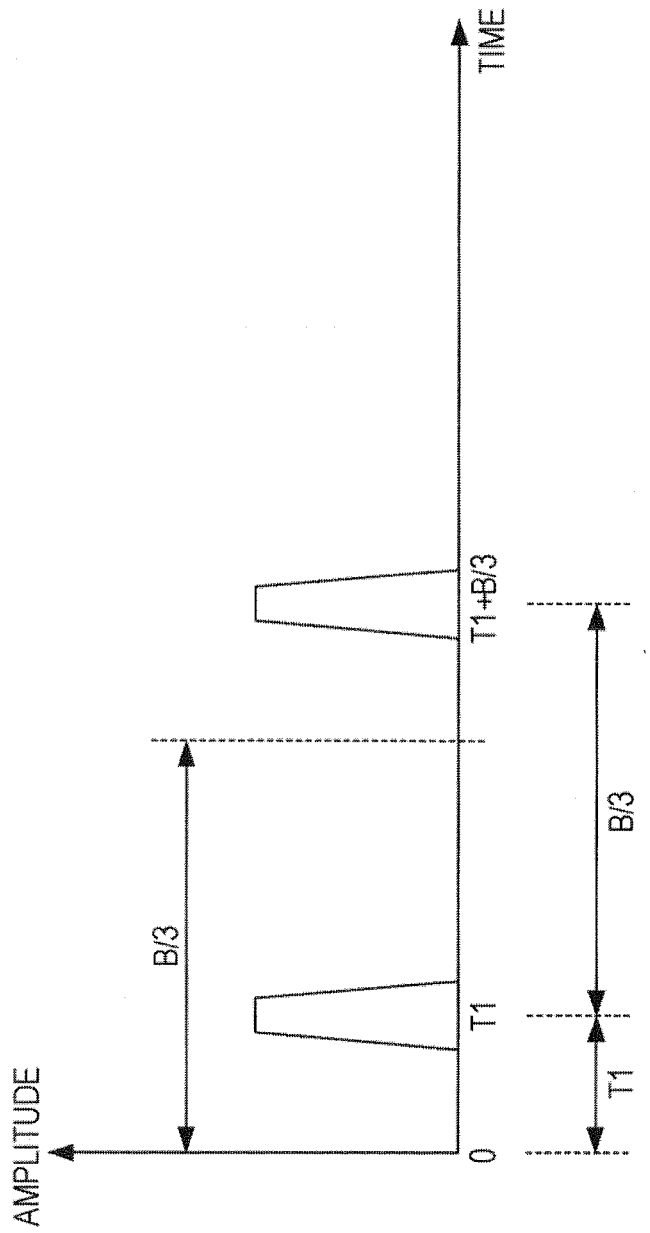
FIG. 6 is a diagram illustrating an example of an aliasing phenomenon which will occur in the case that a pilot signal which is present every three carriers has been subjected to inverse fast Fourier transformation (IFFT) processing.

FIG. 6 is a diagram illustrating an example of the aliasing phenomenon which may occur in the case that the pilot signals which are present every three carriers have been subjected to IFFT processing. In FIG. 6, a period B is the length of OFSM's effective symbol. In the case that pilot signals are present every three carriers, the aliasing phenomenon may occur at B/3 intervals. For example, it is assumed that an impulse response appears at a time (T1+B/3) in the case that pilot signals which are present every one carrier have been subjected to IFFT processing. Under the above mentioned transmission path condition, in the case that pilot signals which are present every three carriers have been subjected to IFFT processing, the impulse response may appear at a time T1 which is earlier than the time (T1+B/3) for a time B/3. As described above, a phenomenon in which a delayed wave of the length exceeding a maximum analysis range appears in the maximum analysis range in a state in which it is folded back by the length corresponding to the maximum analysis range is called the aliasing phenomenon.

Description will be further made returning to explanation of the example in FIG. 1. The IFFT type estimator 9 extracts a group of signals as the multipath signal candidates in the OFDM signal on the basis of the time-domain waveform signal that has been generated by performing IFFT processing on a plurality of pilot signals which are inserted into the OFDM signal so converted to the frequency domain signal at fixed frequency intervals. The IFFT type estimator 9 copies the time-domain waveform signal which has been generated by being subjected to IFFT processing so as to be also generated at a time which is shifted for a time period which is integer times as long as the maximum analysis range. For example, as illustrated in the example in FIG. 6, it is assumed that the pilot signals which are present every three carriers are subjected to IFFT processing and the impulse response appears at the time T1. In the above mentioned case, the impulse response is copied so as to be also generated at a time (T1−B/3) taking the above aliasing phenomenon into consideration. It may become possible to extract the group of signals as the multipath signal candidates by extending the range up to the section of the effective symbol which may generate beyond the maximum analysis range by copying and generating the impulse response taking the aliasing phenomenon into consideration. The IFFT type estimator 9 compares the amplitude of the generated impulse response with a threshold value which has been set in advance and outputs path delay information 11 on the impulse response of the amplitude which is larger than the threshold value. The path delay information 11 is information indicating the delay time and signal strength of each impulse response.

In the first embodiment, the IFFT unit 8 uses the pilot signals which have been subjected to interpolation arithmetic processing using the time direction interpolation unit 6. As an alternative, the time-domain waveform signal may be generated by performing IFFT processing on pilot signals which are present every twelve carriers (the carrier interval K=12) and are not yet subjected to interpolation arithmetic processing. The more the carrier interval K increases, the more the maximum analysis range obtained by IFFT processing is reduced and the more the number of multipath signal candidates which are estimated using the IFFT type estimator 9 is increased. The number of multipath signal candidates to be estimated may be reduced by generating a time-domain waveform signal which has been subjected to IFFT processing with the pilot signals which have been subjected to interpolation arithmetic processing and are present at a carrier interval K of a small number of carriers. The number of TAPs of the matched filter which will be described later may be reduced by reducing the number of multipath signal candidates.

The matched filter type estimator 10 extracts a multipath signal from within a group of signals as the multipath signal candidates on the basis of an autocorrelation arithmetic value between the time domain OFDM signal 12 that has been output from the orthogonal modulation unit 22 and a signal that has been delayed in accordance with the pulse width and the pulse generation timing of a multipath signal candidate which has been extracted using the IFFT type estimator 9. The matched filter type estimator 10 compares the path delay information that has been estimated by performing the autocorrelation arithmetic processing with the path delay information 11 that has been estimated using the IFFT type estimator 9. The matched filter type estimator 10 outputs path detection information 13 which may serve as a reference of the FFT processing start timing that the window control unit 14 sets in accordance with a result of comparison between two pieces of path delay information. The FFT unit 3 is allowed to convert the time domain OFDM signal 12 to the frequency domain OFDM signal with accuracy by setting the FFT processing start timing on the basis of results of two estimations performed. Next, details of the matched filter type estimator 10 will be described with reference to FIG. 7 and FIG. 8.

Figure 7:
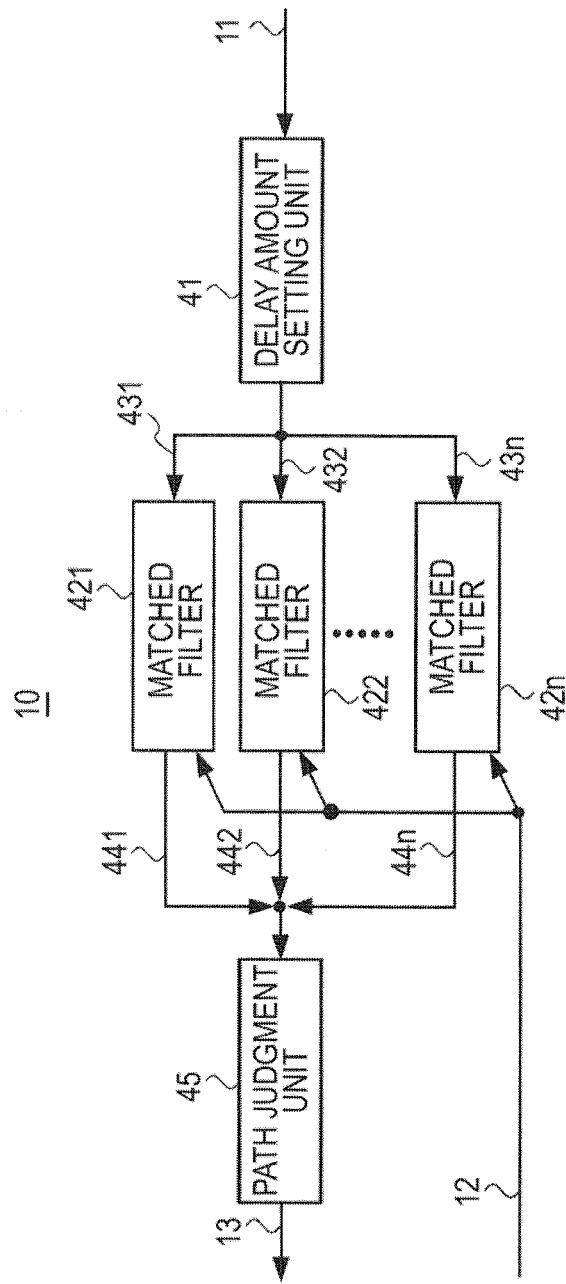
FIG. 7 is a detailed block diagram illustrating an example of a matched filter type estimator 10.

FIG. 7 is a detailed block diagram illustrating an example of the matched filter type estimator 10. The matched filter type estimator 10 includes a delay amount setting unit 41, matched filters 42$n$ (n=1, 2, ...), and a path judgment unit 45.

The delay amount setting unit 41 outputs the phase (path delay) information 11 output from the IFFT type estimator 9 to the plurality of matched filters 42$n$. More specifically, for example, the delay amount setting unit 41 receives the plurality of pieces of path delay information 11 that have been serially sent from the IFFT type estimator 9 and sends a plurality of pieces of path delay information 43$n$ generated for each impulse response to the plurality of matched filters 42$n$ in order.

Each of the plurality of matched filters 42$n$ sets each of the plurality of pieces of received path delay information 43$n$ as an initial delay amount and performs autocorrelation arithmetic processing on the OFDM signal 12 sent from the orthogonal modulation unit 22. The matched filters 42$n$ output results of execution of the autocorrelation arithmetic processing as a plurality of pieces of autocorrelation information 44$n$ (n=1, 2, ...). The plurality of pieces of autocorrelation information 44$n$ respectively include the plurality of pieces of path delay information 43$n$ corresponding to them.

The path judgment unit 45 receives in order the plurality of pieces of autocorrelation information 44$n$ that have been respectively output from the plurality of matched filters 42$n$. The path judgment unit 45 compares the value if each of the plurality of pieces of received autocorrelation information 44$n$ with a threshold value that has been set in advance and outputs phase information corresponding to an autocorrelation value which is larger than the threshold value as path detection information 13. Incidentally, the threshold value which is set in the path judgment unit 45 may be adjusted on the basis of an output from an Fd estimator 61 or a CINR estimator 62 which will be described later with reference to FIG. 10. More accurate detection of the multipath signal may be attained by changing the threshold value in accordance with a signal receiving situation.

As described above, the matched filter type estimator 10 is allowed to reduce a time taken to perform the multipath estimating process by performing autocorrelation arithmetic processing operations for multipath estimation in parallel with one another using the plurality of marched filters 42$n$. Next, details of a matched filter 421 will be described with reference to FIG. 8.

Figure 8:
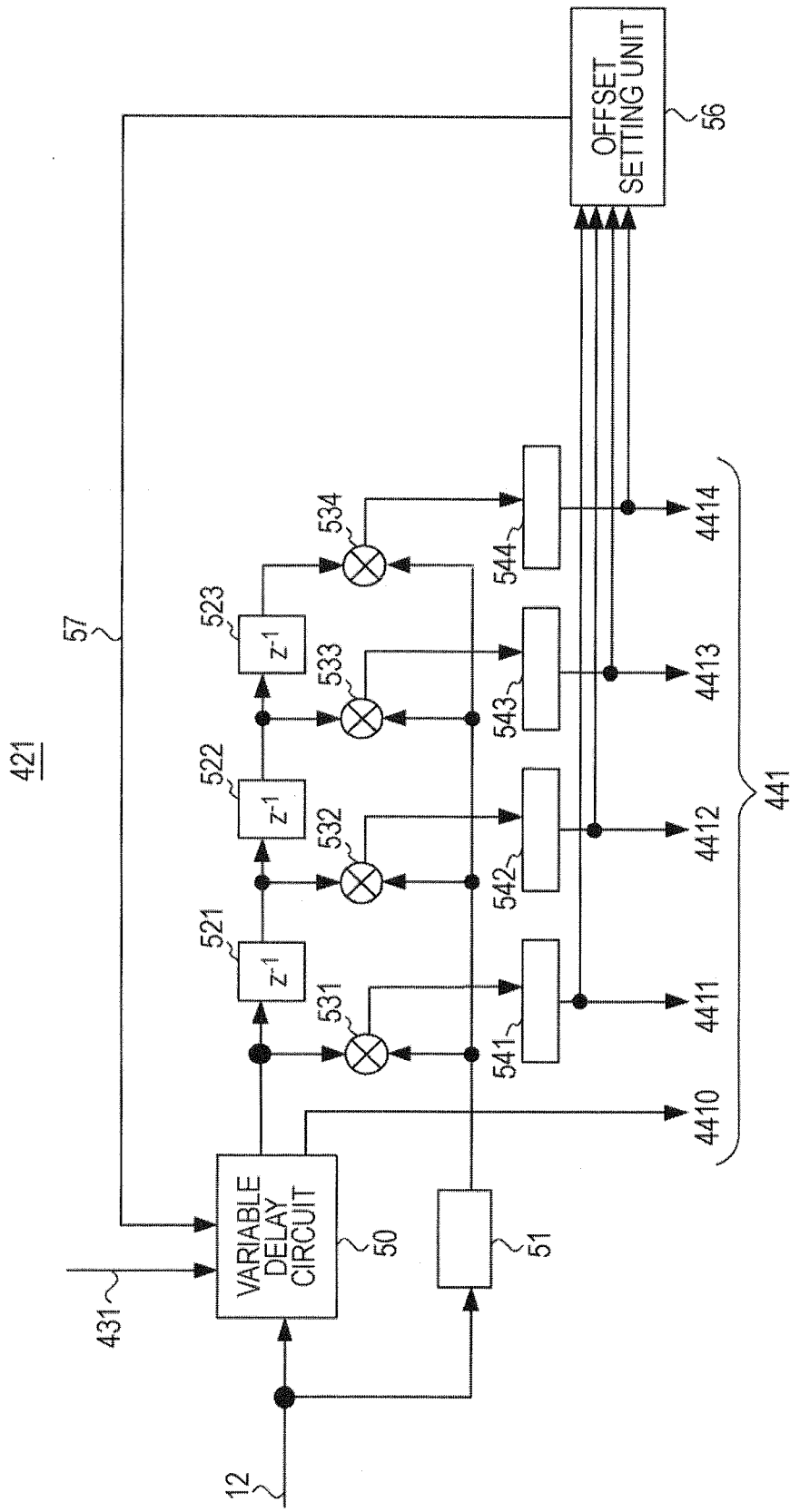
FIG. 8 is a detailed block diagram illustrating an example of a matched filter.

FIG. 8 is a detailed block diagram of the matched filter 421 which is one of the above mentioned plurality of matched filters. The matched filter 421 calculates the autocorrelation value of the received OFDM signal 12 while gradually increasing a phase difference using received phase information 431 as an initial value. Other matched filters are configured and function in the same manner as the marched filter 421. Therefore, the matched filter 421 will be described in detail and description of other matched filters will be omitted.

The matched filter 421 includes a variable delay circuit 50, delay circuits 521, 522 and 523, integrating meters 531, 532, 533 and 534, a complex conjugate arithmetic unit 51, integrating circuits 542, 542 and 543 and an offset setting unit 56.

Assuming that the delay amount is T and the OFDM signal which is obtained at a time t is r(t), the autocorrelation value R(T) which is obtained with the delay amount T will be R(T)=E|r(t−T)×r(t)*|, wherein E| | is a ensemble mean and * is a conjugate.

The variable delay circuit 50 receives the OFDM signal 12. The variable delay circuit 50 shifts the phase of the received OFDM signal 12 in accordance with the phase information 431 and outputs a phase-shifted OFDM signal. In addition, the variable delay circuit 50 varies the delay amount of the OFDM signal 12 in accordance with path delay information 4410 obtained by adding an offset mount which has been output from the offset setting unit 56 to the path delay information 431 and outputs the path delay information 4410.

The complex conjugate arithmetic unit 51 arithmetically operates and outputs the conjugate of the received OFDM signal 12. The integrating meter 531 calculates a product of an OFDM signal r(t−T) the delay amount of which has been varied in accordance with the path delay information 431 and the conjugate of the not delayed OFDM signal r(t) and outputs a result of complex multiplication performed.

The integrating circuit 541 integrates a result of complex multiplication performed using the integrating meter 531 and outputs a value of integration as an autocorrelation value 4411.

The delay circuit 521 delays the OFDM signal which has been output from the variable delay circuit 50 by the amount corresponding to one clock to be supplied. The integrating meter 532 adds up the delayed OFDM signal and the OFDM signal which has been subjected to complex-conjugate arithmetic processing. The integrating circuit 542 integrates a result of complex multiplication performed using the integrating meter 532 and outputs a value of integration as an autocorrelation value 4412. The same arithmetic processing operations as those performed using the delay circuit 521, the integrating meter 532 and the integrating circuit 542 are performed using the remaining delay circuits 522 and 523, integrating meters 533 and 534 and integrating circuits 543 and 544 to respectively output autocorrelation values 4413 and 4414.

The offset setting unit 56 compares the autocorrelation values 441, 4412, 4413 and 4414 with one another and outputs an offset amount 57 such that the autocorrelation value 4412 or 4413 reaches a maximum.

As described above, the matched filter 421 outputs the phase information 4410 together with the autocorrelation values 4411, 4412, 4413 and 4414 as autocorrelation information 441. The matched filter 421 is allowed to detect the peak value of the autocorrelation value with a small number of TAPs by using the phase (path delay) information 431 as the initial value.

FIG. 9A and FIG. 9B are diagrams illustrating examples of results of multipath signal estimations, in which FIG. 9A illustrates the example of the result of extraction of multipath signal candidates that has been performed on the basis of a result of IFFT processing performed on the pilot signal and FIG. 9B illustrates the example of the result of multipath signal extraction that has been performed by autocorrelation arithmetic processing on the basis of the result of extraction of multipath signal candidates illustrated in FIG. 9A.

In the example in FIG. 9A, impulse responses which are indicated by solid lines and appear at times 0, T1 and T2 are impulse responses that have been output from the IFFT unit 8. In FIG. 9A, TMAX is a maximum analysis range over which estimation may be made by performing IFFT processing. Impulse responses which are indicated by broken lines and appear at times −TMAX, T1-TMAX and T2-TMAX have waveforms that have been generated by shifting the impulse responses output from the IFFT unit 8 for a time −TMAX. In FIG. 9A, the impulse responses which are indicted by the solid lines and broken lines are output from the IFFT estimator 9.

In the example in FIG. 9B, arrows at the times T2-TMAX and 0 indicate results of autocorrelation arithmetic processing operations performed using the matched filter type estimator 10 on the basis of the path delay information 11 output from the IFFT estimator 9. The matched filter type estimator 10 outputs a result of autocorrelation arithmetic processing performed as path detection information 13.

Description will be further made returning to explanation of the example in FIG. 1. The window control unit 14 adjusts a timing at which FFT processing is performed on the OFDM signal 12 on the basis of a multipath signal appearing timing which has been estimated using the matched filter type estimator 10. The window control unit 14 receives the path detection information 13 output from the matched filter type estimator 10. The window control unit 14 sets a start timing of FFT arithmetic processing performed using the FFT unit 3 and a range of over which the FFT unit 3 performs the FFT arithmetic processing on the basis of the received path detection information 13.

As described above, the receiving device 20 is allowed to reduce the circuit scale and the arithmetic processing amount of the autocorrelation circuit with no reduction of accuracy in multipath signal estimation by performing autocorrelation arithmetic processing on the basis of a multipath signal candidate appearing timing that has been estimated by performing IFFT processing on the pilot signals.

Figure 10:
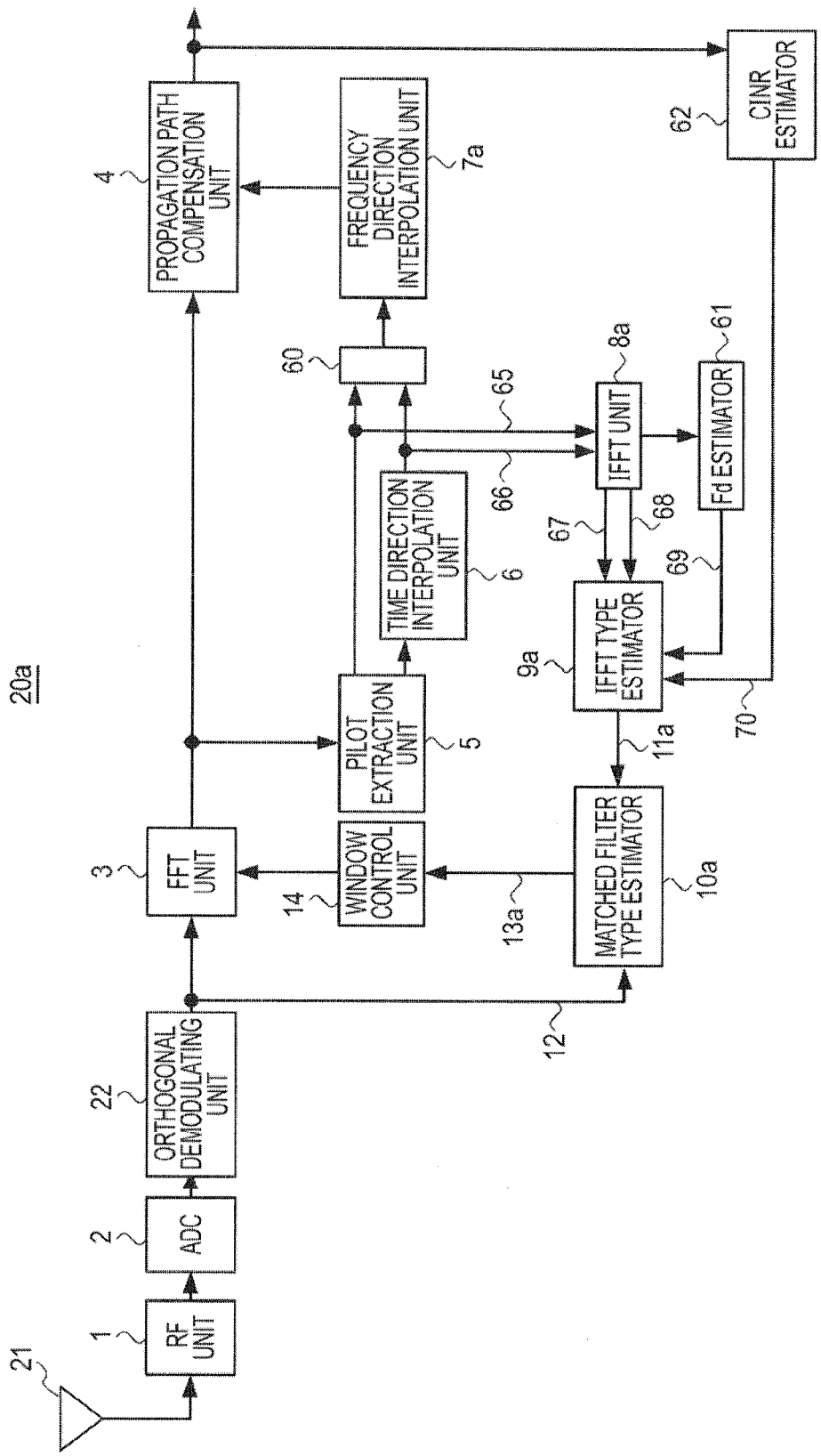
FIG. 10 is a block diagram illustrating an example of a receiving device.

FIG. 10 is a block diagram illustrating an example of a receiving device 20*a* according to a second embodiment. The receiving device 20*a* performs IFFT processing on an extracted pilot signal on the basis of a signal that has been interpolated in the time axis direction and a signal which is not interpolated. The circuit scale of a matched filter type estimator may be reduced by combining with each other two time-domain waveform signals which have been subjected to IFFT processing. The receiving device 20*a* includes the RF unit 1, the ADC 2, the orthogonal modulation unit 22, the FFT unit 3, the propagation path compensation unit 4, the pilot extraction unit 5, the time direction interpolation unit 6, a selection unit 60, a frequency direction interpolation unit 7*a*, an IFFT unit 8*a*, the Fd estimator 61, the CINR (Carrier to Interference pulse Noise Ratio) estimator 62, an IFFT type estimator 9*a*, a matched filter type estimator 10*a* and the window control unit 14. With respect to the receiving device 20*a*, the same numerals are assigned to blocks that function in the same manner as those included in the receiving device 20 illustrated in FIG. 1 and description thereof will be omitted.

The selection unit 60 selects one of a pilot signal 65 which has been extracted using the pilot extraction unit 5 and a pilot signal 66 which has been interpolated in the time axis direction using the time direction interpolation unit 6 and outputs the selected signal to the frequency direction interpolation unit 7*a*.

The frequency direction interpolation unit 7*a* performs interpolation arithmetic processing by changing an interval at which interpolation arithmetic processing is performed in the frequency axis direction depending on which pilot signal has been selected using the selection unit 60.

The IFFT unit 8*a* performs IFFT processing on the pilot signal 65 which is not interpolated in the time axis direction to output a time-domain waveform signal 67. In addition, the IFFT unit 8*a* performs IFFT processing on the pilot signal 66 which has been interpolated in the time axis direction to output a time-domain waveform signal 68.

Next, a relation between a range over which estimation may be made using the IFFT unit 8*a* and a carrier interval at which pilot signals are present will be described. The carrier interval of the pilot signals which are not interpolated in the time axis direction is 12 (the carrier interval K=12) (that is, the pilot signals are present every twelve carriers) as illustrated in the example in FIG. 3. The carrier interval of the pilot signals which have been interpolated in the time axis direction is 3 (the carrier interval K=3) as illustrated in the example in FIG. 4. Assuming that the effective symbol length is Ts, a maximum analysis range TMAX over which estimation may be made using the IFFT unit 8*a* will be Ts/K (TMAX=Ts/K). In addition, assuming that the number of points of the IFFT unit is N, a time resolution $\Delta$T will be TMAX/N ($\Delta$T=TMAX/N). That is, TMAX is inversely proportional to K and $\Delta$T is proportional to TMAX. Thus, the more the carrier interval K is increased, the more the maximum analysis range TMAX and the time resolution $\Delta$T are reduced. The maximum analysis range TMAX obtained when K=3 is four times the maximum analysis range obtained when K=12.

The Fd estimator 61 estimates a Doppler frequency Fd. In the case that the receiving device 20a receives an OFDM signal while moving, the phase of the pilot signal thereof is rotated. Thus, the Fd estimator 61 is allowed to estimate the Doppler frequency on the basis of the phase rotation amount of the pilot signal. The Fd estimator 61 estimates the Doppler frequency on the basis of the impulse response which has been subjected to IFFT processing and outputs an estimated value 69 thereof.

The CINR estimator 62 receives data that has been compensated for and output from the propagation path compensation unit 4. In the second embodiment, the CINR estimator 62 outputs an EVM (Error Vector Magnitude) value 70 which is the value obtained by normalizing a positional displacement between an ideal modulation signal that has been set in advance in the CINR estimator 62 and a measured modulation signal that has been output from the propagation path compensation unit 4 with the ideal modulation signal in an IQ plane in which the I axis plots a real number component and the Q axis plots an imaginary number component for orthogonal modulation.

The IFFT unit 9a synthesizes with each other time-domain waveform signals that have been subjected to IFFT processing on the basis of pilot signals of different carrier intervals to obtain a narrow-pulse-width impulse response. An arithmetic processing range over which autocorrelation arithmetic processing is to be performed using the matched filter may be reduced by reducing the pulse width of the impulse response. As a result, it may become possible to reduce the circuit scale of the matched filter type estimator 10a.

As described above, output values from the Fd estimator 61 and the CINR estimator 62 are changed in accordance with the OFDM signal receiving situation. The IFFT estimator 9a changes the threshold value of the impulse response to be estimated using the matched filter type estimator 10a on the basis of the estimated value 69 output from the Fd estimator 61 and the EVM value 70 output from the CINR estimator 62. The IFFT estimator 9a is allowed to suitably select an impulse response to be estimated by changing the threshold value in accordance with the OFDM signal receiving situation. Next, details of the IFFT estimator 9a will be described with reference to FIG. 11.

Figure 11:
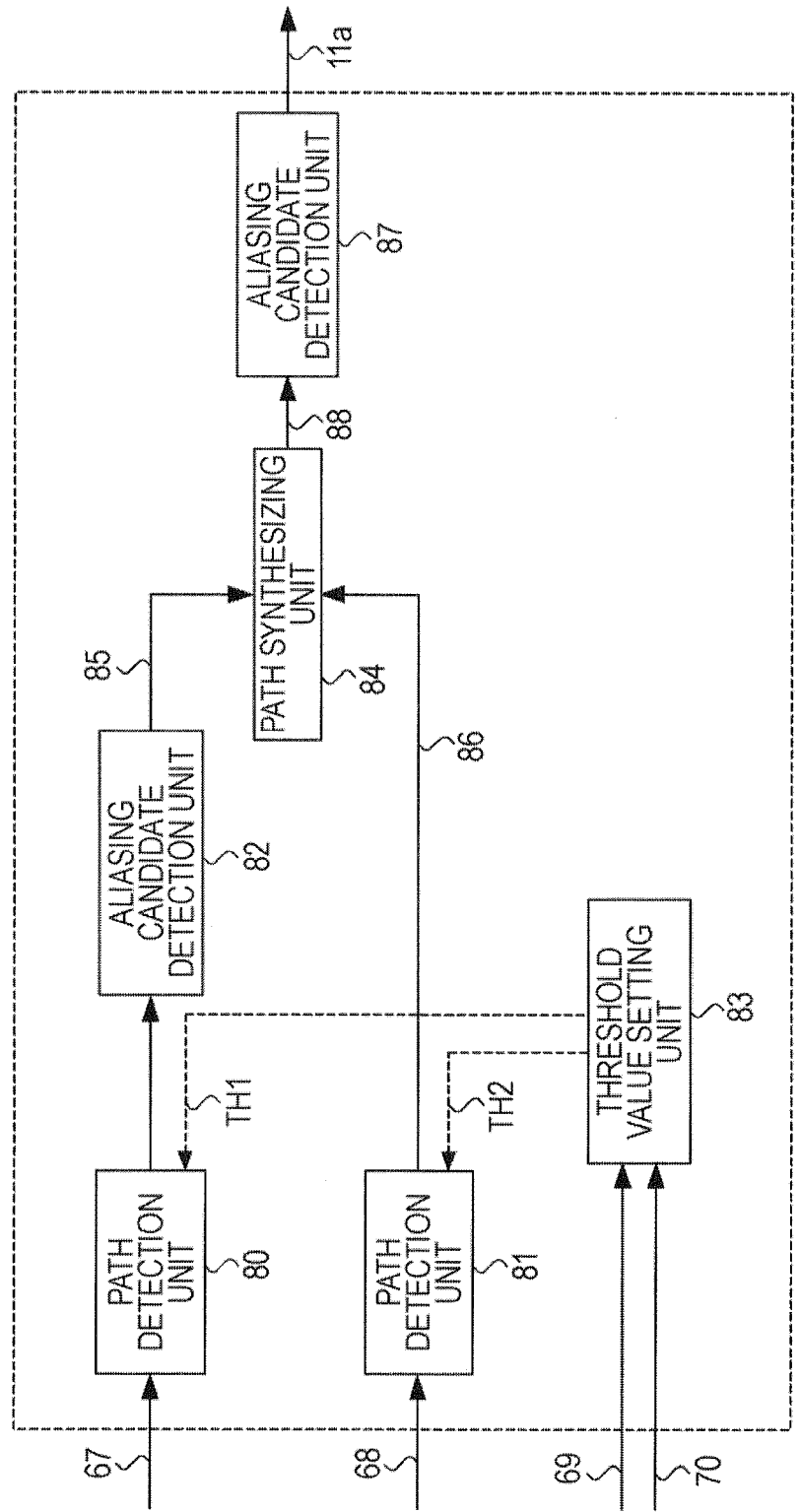
FIG. 11 is a detailed diagram illustrating an example of an IFFT estimator.

FIG. 11 is a detailed block diagram illustrating an example of the IFFT estimator 9a. The IFFT estimator 9a includes path detection units 80 and 81, aliasing candidate detection units 82 and 87, a threshold setting unit 83 and a path synthesizing unit 84.

The path detection unit 80 compares the amplitude value of the input time-domain waveform signal 67 with a threshold value TH1 that has been set using the threshold value setting unit 83 and outputs the amplitude of the impulse response in the time-domain waveform signal which is larger than the threshold value TH1 and the time at which the impulse response appears to the aliasing candidate detection unit 82.

The path detection unit 81 compares the amplitude value of the input time-domain waveform signal 68 with a threshold value TH2 that has been set using the threshold value setting unit 83 and outputs the amplitude of the impulse response in the time-domain waveform signal which is larger than the threshold value TH2 and the time at which the impulse response appears to the path synthesizing unit 84.

The aliasing candidate detection unit 82 generates an impulse response output from the path detection unit 80 at a timing which is shifted for a time period corresponding to integer times the maximum analysis range TMAX taking the aliasing phenomenon into consideration. In the second embodiment, the carrier interval K of the pilot signals for generation of the waveform signal 67 is 12 (K=12) and the carrier interval K of the pilot signals for generation of the time-domain waveform signal 68 is 3 (K=3). Thus, the aliasing candidate detection unit 82 copies the impulse response output from the path detection unit 80 so as to be generated at timings that are respectively shifted for time periods corresponding to one time, two times and three times the maximum analysis range. A time-domain waveform signal 85 which is output from the aliasing candidate detection unit 82 may be expanded over the maximum analysis range of a time-domain waveform signal 86 which is output from the path detection unit 81 by taking the aliasing phenomenon into consideration on the basis of the carrier interval.

The path synthesizing unit 84 compares the amplitude value of each of the time-domain waveform signal 85 output from the aliasing candidate detection unit 82 and the time-domain waveform signal 86 output from the path detection unit 81 with a threshold value to obtain a delay amount with which the amplitude values of both the time-domain waveform signals exceed a fixed threshold value. The path synthesizing unit 84 outputs the obtained delay amount to the aliasing candidate detection unit 87 as path delay information 88.

The aliasing candidate detection unit 87 copies the respective impulse responses included in the path delay information 88 that has been output from the path synthesizing unit 84 so as to be respectively generated at times which are shifted from each other for a time period −TMAX. The aliasing candidate detection unit 87 outputs phase information 11a so copied and generated. Next, details of synthesizing of time-domain waveform signals using the path synthesizing unit 84 will be described with reference to FIG. 12.

Figure 12:
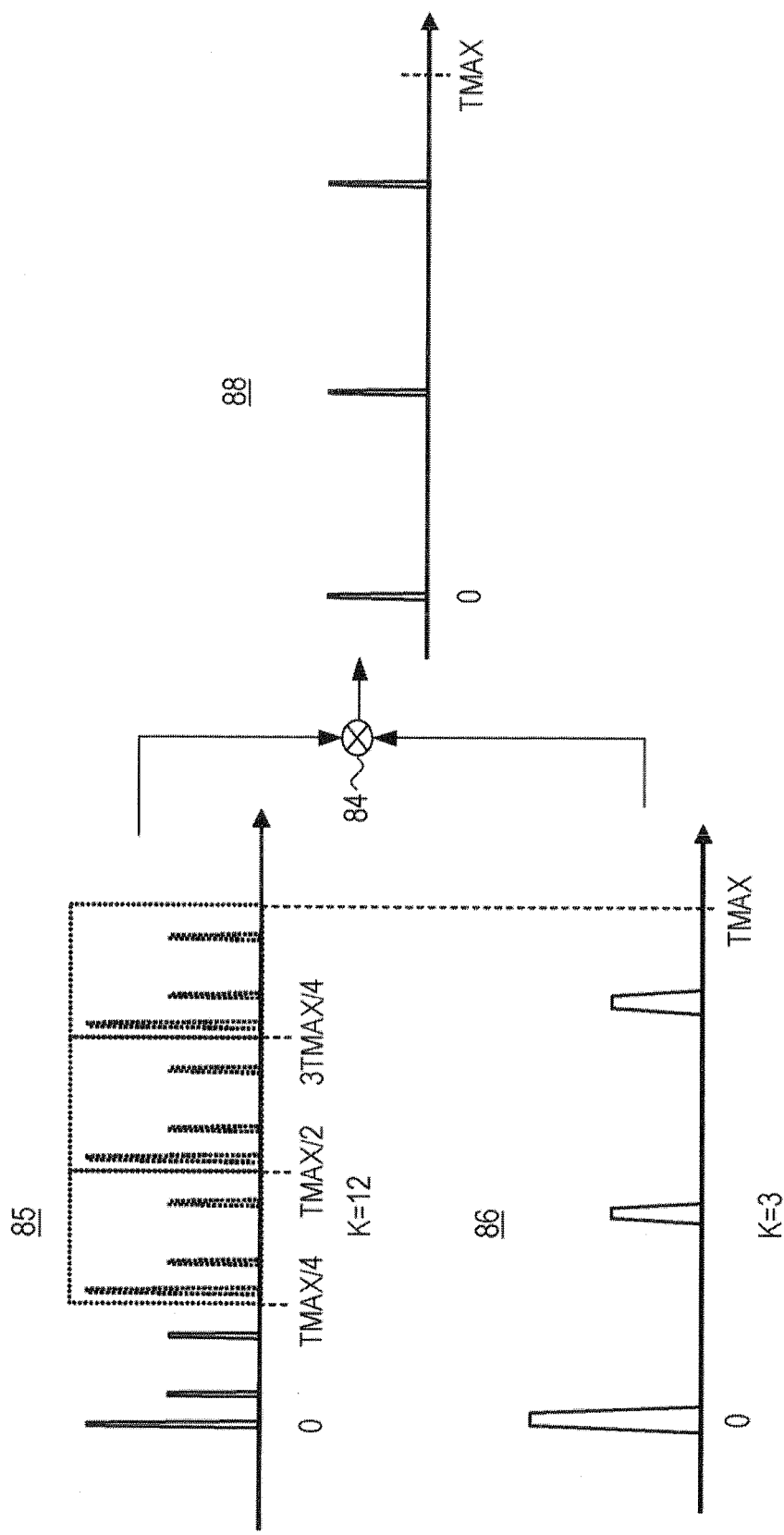
FIG. 12 is a diagram illustrating an example of time-domain waveform signals before synthesized and a time-domain waveform signal after synthesized.

FIG. 12 is a diagram illustrating an example of time-domain waveform signals before synthesized and a time-domain waveform signal after synthesized. The time-domain waveform signal 85 is output from the aliasing candidate detection unit 82. The time-domain waveform signal 86 is output from the path detection unit 81. In the time-domain waveform signal 85, a solid line part indicates a time-domain waveform input into the aliasing candidate detection unit 82 and a dotted line part indicates a time-domain waveform that has been generated using the aliasing candidate detection unit 82 by taking the aliasing phenomenon into consideration.

Assuming that TMAX is a maximum analysis range of the time-domain waveform signal 86, the maximum analysis range of the solid line part in the time-domain waveform signal 85 will be TMAX/4. Likewise, the time width of each impulse response in the solid line part in the time-domain waveform signal 85 will be one-fourth the time width of the impulse response in the time-domain waveform signal 86. The aliasing candidate detection unit 82 copies the respective impulse responses in the solid line parts in the time-domain waveform signal 85 so as to be generated in the ranges TMAX/4, TMAX/2 and 3TMAX/4 as impulse responses which are indicated by dotted lines in the waveform signal 85. As a result, the aliasing candidate detection unit 82 is allowed to output the time-domain waveform signal 85 having the same time domain as the maximum analysis range TMAX of the time-domain waveform signal 86 which is output from the path detection unit 81.

The path synthesizing unit 84 synthesizes the time-domain waveform signal 85 with the time-domain waveform signal 86. As a result of synthesizing of these two waveform signals with each other, in the case that no impulse response is present in the time-domain waveform signal 86 at a timing at which an impulse response is present in the time-domain waveform signal 85, the path synthesizing unit 84 outputs the path delay information 88 including no impulse response, while in the case that an impulse response is present in the time-domain waveform signal 86 at a timing at which an impulse response is present in the time-domain waveform signal 85, the path synthesizing unit 84 outputs the path delay information 88 having the same pulse width as that of the time-domain waveform signal 85. It may become possible to obtain a time-domain waveform signal which is reduced in the number of multipath signal candidates and is reduced in the pulse width of each impulse response by synthesizing a plurality of time-domain waveform signals which have been subjected to IFFT processing with each other on the basis of pilot signals of different carrier intervals.

Description will be further made returning to explanation of the example in FIG. 11. The threshold value setting unit 83 determines and outputs values of threshold value TH1 to be set in the path detection unit 80 and the threshold value TH2 to be set in the path detection unit 81 on the basis of the received estimated value 69 and the EVM value 70. Next, details of the operation of the threshold value setting unit 83 will be described with reference to FIG. 13.

Figure 13:
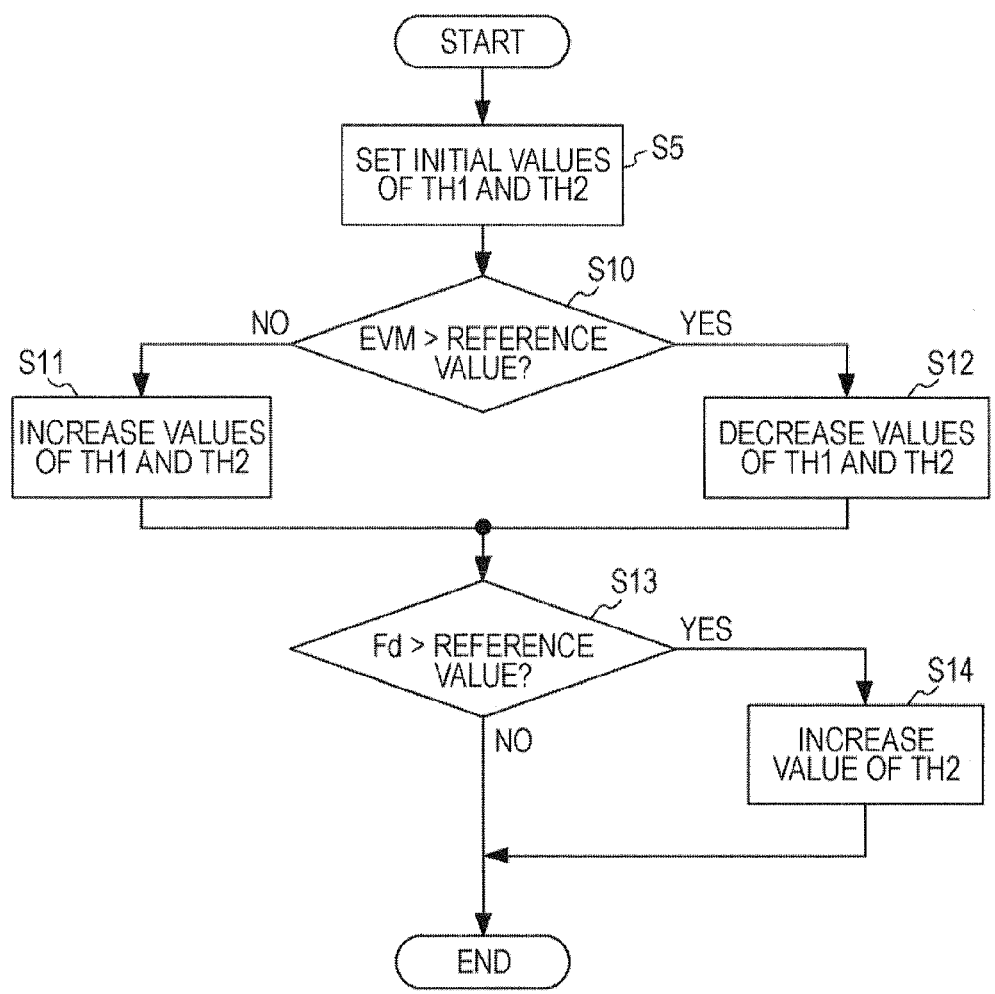
FIG. 13 is a diagram illustrating an example of a flowchart of the operation of a threshold value setting unit.

FIG. 13 is a diagram illustrating an example of a flowchart of the operation of the threshold value setting unit 83. The threshold value setting unit 83 sets initial values of the threshold values TH1 and TH2 to be output (S5). The threshold value setting unit 83 compares the input EVM value 70 with a reference value that has been set in advance in the threshold value setting unit 83 (S10). In the case that the input EVM value 70 is larger than the reference value (S10: YES), the threshold value setting unit 83 reduces the values of the threshold values TH1 and TH2 to be output (S12). The larger the EVM value 70 is, the lower the level of noise in a received signal is. Thus, the probability to detect an impulse response may be increased by reducing the threshold values TH1 and TH2.

In the case that the input EVM value 70 is smaller than the reference value (S10: NO), the threshold value setting unit 83 increases the threshold values TH1 and TH2 to be output (S11). The smaller the EVM value 70 is, the higher the level of noise in the received signal is. Thus, the probability to erroneously detect noise as the impulse response may be reduced by increasing the threshold values TH1 and TH2.

The threshold value setting unit 83 compares the estimated value 69 of the input Doppler frequency Fd that has been input into it with a reference value that has been set in advance in the threshold value setting unit 83 (S13). In the case that the input estimated value 69 is larger than the reference value (S13: YES), the threshold value setting unit 83 increases the threshold value TH2 to be output (S14). In the case that the estimated value of the Doppler frequency Fd is larger than the reference value, the time dependent fluctuating amount of the received signal is increased. In the case that pilot signals have been subjected to interpolation arithmetic processing in the time axis direction, an error component included in each pilot signal is increased with increasing the estimated value 69 of the Doppler frequency Fd. Thus, in the case that the estimated value 69 of the Doppler frequency Fd is larger than the reference value, the probability to erroneously detect the noise as the impulse response may be reduced by increasing the threshold value TH2. In the case that the input estimated value 69 is smaller than the reference value (S13: NO), the threshold value setting unit 83 terminates performance of a threshold value setting process.

As described above, the threshold value setting unit 83 is allowed to set the threshold values used for impulse response detection to appropriate values in accordance with the signal receiving condition.

Description will be further made returning to explanation of the example in FIG. 10. The matched filter type estimator 10*a* estimates the phase information on the multipath signal by performing autocorrelation arithmetic processing on the basis of the OFDM signal 12 output from the orthogonal modulation unit 22. The matched filter type estimator 10*a* compares the phase information that has been estimated by performing autocorrelation arithmetic processing with path delay information 11*a* that has been estimated using the IFFT type estimator 9*a*. The matched filter type estimator 10*a* outputs path detection information 13*a* to be used as a reference of an FFT processing start timing that the window control unit 14 sets in accordance with a result of comparison between two pieces of phase information. As described above, the FFT unit 3 is allowed to convert the time domain OFDM signal to the frequency domain OFDM signal with accuracy by setting the FFT processing start timing on the basis of two results of estimations.

The difference between the matched filter type estimator 10*a* and the matched filter type estimator 10 lies in the circuit configuration of each matched filter included therein. The pulse width of the phase information 11*a* which is input into the matched filter type estimator 10*a* is one-fourth the pulse width of the phase information 11 which is input into the matched filter type estimator 10. Imaging to perform autocorrelation arithmetic processing over the range of the pulse width of the impulse response obtained by performing IFFT processing on the pilot signals, if the pulse width of the phase information 11*a* is reduced to one-fourth the pulse width of the phase information 11, it will be allowed to reduce the circuit scale of the circuit that delays each signal for a fixed time period each time for autocorrelation arithmetic processing to one-fourth accordingly. Next, details of the matched filter type estimator 10*a* will be described with reference to FIG. 14 and FIG. 15.

Figure 14:
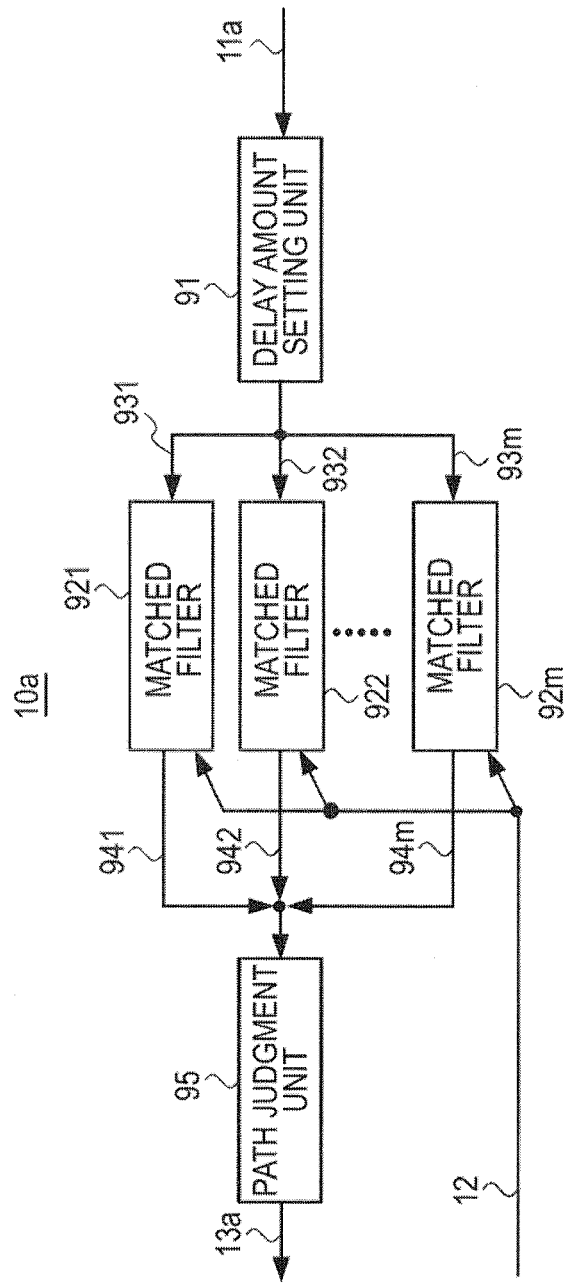
FIG. 14 is a detailed diagram illustrating an example of a matched filter type estimator.

FIG. 14 is a detailed block diagram illustrating an example of the matched filter type estimator 10*a*. The matched filter type estimator 10*a* includes a delay amount setting unit 91, matched filters 92*m* (m=1, 2, . . . ), and a path judgment unit 95.

The delay amount setting unit 91 outputs the phase information 11*a* output from the IFFT type estimator 9*a* to the plurality of matched filters 92*m*. More specifically, for example, the delay amount setting unit 91 receives the plurality of pieces of phase information 11*a* that have been serially sent from the IFFT type estimator 9*a* and allocates and sends the respective pieces of phase information to the plurality of matched filters 92*m* in order. The delay amount setting unit 91 functions in the same manner as the delay amount setting unit 41.

Each of the plurality of matched filters 92*m* sets each of the plurality of pieces of received path delay information 93*m* as an initial delay amount and performs autocorrelation arithmetic processing on the OFDM signal 12 that has been sent from the orthogonal modulation unit 22. The matched filters 92*m* output results of autocorrelation arithmetic processing operations performed as a plurality of pieces of autocorrelation information 94*m* (m=1, 2, . . . ). The plurality of pieces of auto-correlation information 94*m* respectively include a plurality of pieces of phase information 93*m* corresponding to them. The number m of the matched filters in FIG. 4 is equal to or smaller than the number n of the matched filters in FIG. 7.

The path judgment unit 95 receives in order the plurality of pieces of autocorrelation information 94*m* that have been respectively output from the plurality of matched filters 92*m*. The path judgment unit 95 compares each of the plurality of pieces of received autocorrelation information 94m with a threshold value that has been set in advance and outputs a maximum autocorrelation value which is larger than the threshold value as the path detection information 13a. Incidentally, the path judgment unit 95 functions in the same manner as the path judgment 45.

As described above, the matched filter type estimator 10a is allowed to reduce a time taken to perform the multipath signal estimating process by performing the autocorrelation arithmetic processing operations for extraction of the multipath signal in parallel with one another using the plurality of marched filters 42n.

Figure 15:
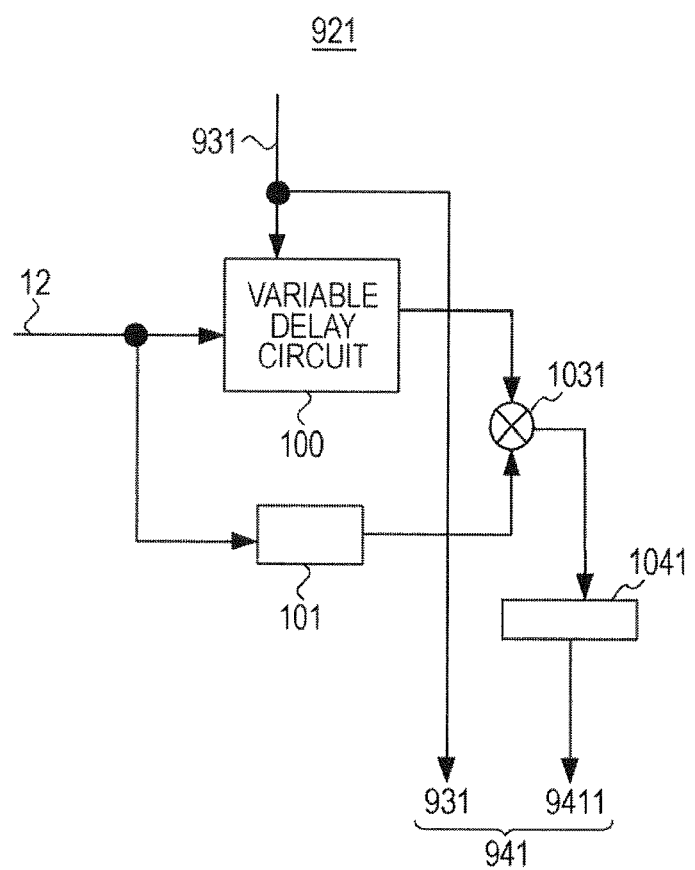
FIG. 15 is a detailed diagram illustrating an example of a marched filter 921.

FIG. 15 is a detailed block diagram of a matched filter 921 which is one of the plurality of matched filters 92m. The matched filter 921 calculates the autocorrelation value of the received OFDM signal 12 by shifting the phase of the OFDM signal 12 using received phase information 931 as an initial value. Other matched filters are configured and function in the same manner as the marched filter 921. Therefore, the matched filter 921 will be described in detail and description of other matched filters will be omitted.

The matched filter 921 includes a variable delay circuit 100, integrating meters 1031 and 1032, a complex conjugate arithmetic unit 101, and an integrating circuit 1041.

The variable delay circuit 100 receives the OFDM signal 12. The variable delay circuit 100 shifts the phase of the received OFDM signal 12 in accordance with the phase information 931 and outputs a phase-shifted OFDM signal.

The complex conjugate arithmetic unit 101 arithmetically operates and outputs the conjugate of the received OFDM signal 12. The integrating meter 1031 calculates a product of the OFDM signal that has been phase-shifted in accordance with the path delay information 931 and the conjugate of the OFDM signal obtained before phase-shifting and outputs a result of complex multiplication performed.

The integrating circuit 101 integrates a result of complex multiplication performed using the integrating meter 1031 and outputs a value of integration as an autocorrelation value 9411. The matched filter 921 outputs the phase information 931 as autocorrelation information 941 together with the autocorrelation value 9411.

As described above, the matched filter 921 is allowed to detect the peak value of the autocorrelation value with the small number of TAPs by setting the phase information 931 as the initial value. The pulse width of the signal to be subjected to autocorrelation arithmetic processing is reduced and hence the circuit scale of the matched filter 921 is allowed to be further reduced.

Description will be further made returning to explanation of the example in FIG. 10. The window control unit 14 receives the path detection information 13a that has been output from the matched filter type estimator 10a. The window control unit 14 sets the timing at which performance of FFT arithmetic processing is started using the FFT unit 3 and a range over which the FFT arithmetic processing is performed on the basis of the received path detection information 13a.

As described above, the receiving device 20a is allowed to reduce the circuit scale and the arithmetic processing amount of the correlation circuit without reducing the accuracy in path estimation by performing autocorrelation arithmetic processing on the basis of the timings of the group of signals as the multipath signal candidates that have been extracted by performing IFFT processing on the pilot signals. In addition, the receiving device 20a is allowed to further reduce the circuit scale of the autocorrelation arithmetic circuit by using the impulse responses obtained by performing IFFT processing on the pilot signals of different carrier intervals.

FIG. 16 is a diagram illustrating an example of circuit scale reducing effect brought about by the second embodiment in the mode 3 of ISDB which is the standard for digital broadcasting. A row 115 indicates a carrier interval K in each pilot signal and each interpolated pilot signal. A row 116 indicates a maximum analysis range over which pilot signals concerned may be estimated by performing IFFT processing. A row 117 indicates a time resolution. The value in the row 117 is obtained by dividing the maximum analysis range in the row 116 by the number of points of the IFFT unit. A row 118 indicates the number of correlation units installed. In the second embodiment, the number of correlation units is the number of marched filters. A row 119 indicates the number of TAPs per correlation unit. A row 120 indicates the total number of TAPs included in the entire of each receiving device. The total number of TAPs is the product of the number of correlation units in the row 118 and the number of TAPs in the row 119.

A column 110 indicates values of respective items of an existing technique. In the existing technique, the values of respective items are defined in the mode 3 of ISDB-T as a precondition. When the carrier interval K=3, the maximum analysis range reaches 336 μs which is one-third of the effective symbol length (1008 μs). If the number of points of the IFFT unit is 512, the time resolution will reach 0.656 μs from 336/512. In the existing technique, the number of correlation unit is one. In the existing technique, 4096 TAPs are mounted in order to process autocorrelation arithmetic processing of 1008 μs in effective symbol length.

A column 111 indicates values of respective items obtained in the case that the pilot signal has been interpolated in the time axis direction in the first embodiment, that is, when the carrier interval K=3. As in the case in the existing technique, the values of the respective items are calculated in the mode 3 of STD-B31 which is set as a prediction. When K=3, the maximum analysis range and the time resolution respectively reach 336 μs and 0.656 μs as in the case in the existing technique. Assuming that the number of multipath signal candidates which are detected in the maximum analysis range TMAX by performing IFFT processing is N, in the first embodiment, since the impulse response is copied to be generated at a position which is shifted by the range −TMAX, the desirable number of correlation units will reach 2N. As illustrated in the example in FIG. 8, the number of TAPs per correlation unit is four. Thus, the total number of TAPs in the receiving device reaches 8N in the case that the pilot signal has been interpolated in the time axis direction in the first embodiment. For example, as illustrated in FIG. 9, when the number of impulse responses in the range TMAX is 3 (N=3), the total number of TAPs reaches 24 from 8×3. Thus, application of this embodiment allows to reduce the total number of TAPs to about 1/171 that of the existing technique.

A column 112 indicates values of respective items obtained in the case the pilot signal is not interpolated, that is, when the carrier interval K is 12 (K=12). The values of respective items are calculated in the mode 3 of ARIB STD-B31 as in the case in the existing technique. When K=12, the maximum analysis range reaches 84 μs from 1008/12. The time resolution reaches 0.164 μs from 84/512. Each of above mentioned values is reduced to one-fourth the value obtained when the maximum analysis range K is 3 (K=3). Thus, taking aliasing into consideration, the desirable number of correlation units is 8N corresponding to four times the number obtained when K=3. As illustrated in the example in FIG. 15, the number of TAPs per correlation unit is one. Thus, the total number of TAPs in the receiving device which is obtained when the pilot signal is not interpolated in the first embodiment reaches 8N. Thus, in the first embodiment, the total number of TAPs desirable for extraction of the multipath signal is made constant regardless of the value of the carrier interval K.

A column 113 indicates respective values of respective items in the second embodiment. The maximum analysis range is equal to that obtained when the carrier interval K is 3 (K=3) and reaches 336 μs. The time resolution is equal to that obtained when the carrier interval K is 12 (K=12) and reaches 0.164 μs. As a result, the number of correlation units is equal to that obtained when the carrier interval K is 3 (K=3) and reaches 2N and the number of TAPs per correlation unit is equal to that obtained when the carrier interval K is 12 (K=12) and reaches 1. Thus, the total number of TAPs of the receiving device according to the second embodiment reaches 2N. Accordingly, it may become possible to make the total number of TAPs desirable for extraction of the multipath signal smaller than that would be attained in the first embodiment by combining with one another impulse responses which have been subjected to IFFT processing on the basis of pilot signals of different carrier intervals.

Figure 17:
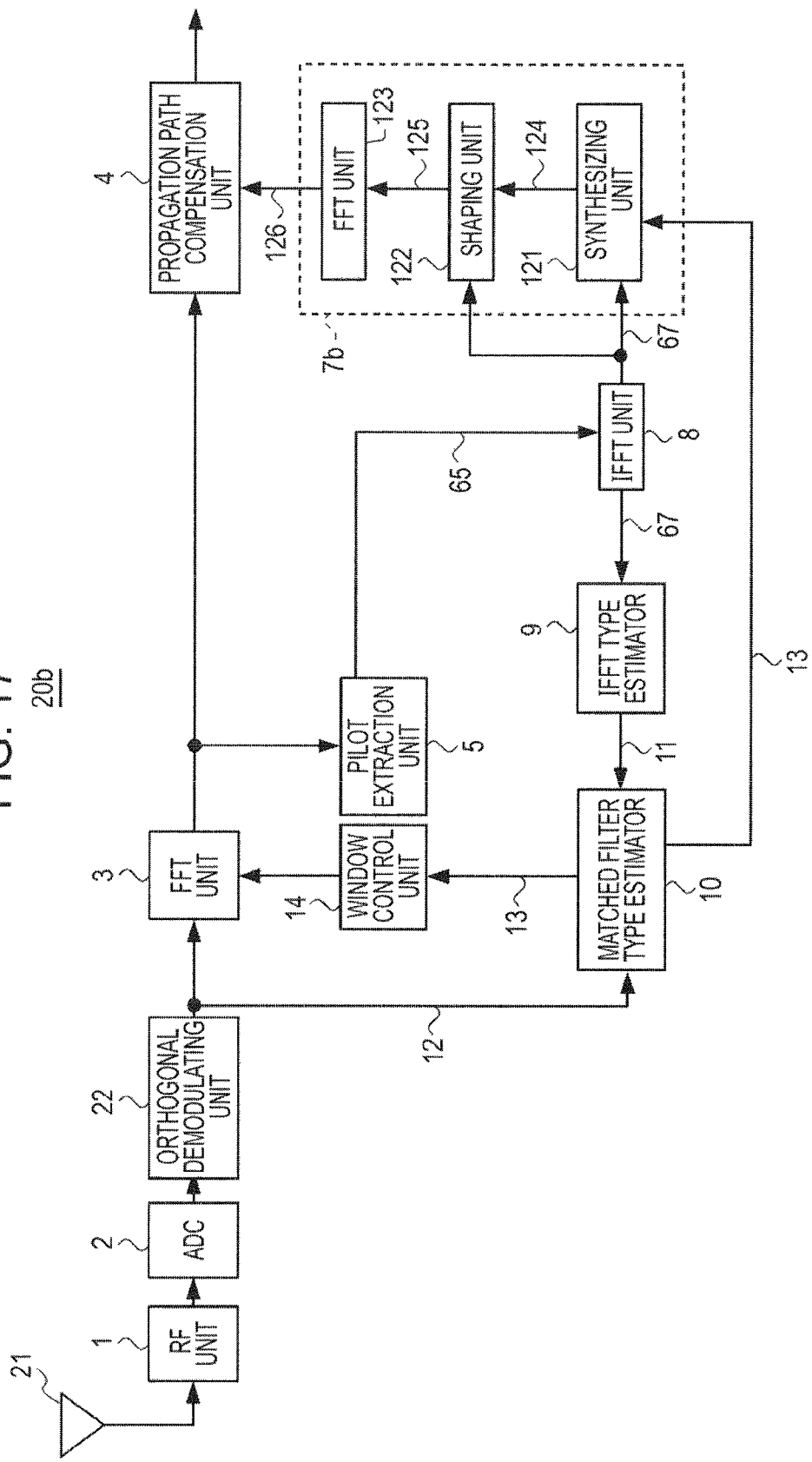
FIG. 17 is a block diagram of an example of a receiving circuit illustrating in detail an example of a frequency direction interpolation unit.

FIG. 17 is a block diagram of an example of a receiving device 20b illustrating in detail an embodiment of the frequency direction interpolation unit 7 illustrated in FIG. 1. In the above mentioned embodiment, the carrier interval K of a pilot signal which is extracted using the pilot extraction unit 5 at a certain time is 12 (K=12). When K=12, the maximum analysis range reaches 84 μs as described above. Thus, in the case that the signal receiving environment of the receiving device 20b has been changed and a multipath signal which may exceed 84 μs in maximum analysis range has been generated under the influence of reflection of a signal from an obstacle such as a building, it may become difficult for the frequency direction interpolation unit 7 to perform interpolation with accuracy. On the other hand, in the case that the pilot signal is interpolated in the time axis direction as illustrated in FIG. 4 such that the carrier interval K reaches 3 (K=3), the maximum analysis range reaches 336 μs and hence it may become possible to detect a multipath signal detection of which may be difficult when K=12. However, in the case that the signal receiving environment of the receiving device 20b has been suddenly changed, it may become difficult to interpolate the pilot signal in the time axis direction with accuracy. In the case that the propagation path has been compensated for using a multipath signal that has been detected on the basis of inaccurate interpolation of the pilot signal in the time axis direction, an erroneous result of compensation may be obtained. According to the embodiment illustrated in FIG. 17, there is provided the receiving device 20b which is configured to compensate for the propagation path with accuracy regardless of a sudden change of its signal receiving environment.

In FIG. 17, the same numerals are assigned to the same members as those in FIG. 1 and description thereof will be omitted. A frequency direction interpolation unit 7b interpolates, in the frequency axis direction, a pilot signal that has been extracted using the pilot extraction unit 5 on the basis of a multipath signal that has been estimated using the matched filter type estimator 10. The frequency direction interpolation unit 7b includes a synthesizing unit 121, a shaping unit 122 and an FFT 123.

The synthesizing unit 121 substitutes the amplitude of each of a time-domain waveform signal 67 output from the IFFT unit 8 and a time-domain waveform signal 13 output from the matched filter type estimator 10 to "1" or "0" on the basis of a fixed threshold value as a reference. For example, the synthesizing unit 121 substitutes an amplitude value which is larger than the threshold value to "1" and an amplitude value which is smaller than the threshold value to "0". The synthesizing unit 121 calculates a logical product of substituted time-domain waveform signals at each time. That is, if each of the amplitudes of two time-domain waveform signals that have been substituted at the same time is "1", the logical product thereof will be "1". On the other hand, if one of the amplitudes of two time-domain waveform signals that have been substituted at the same time is "0", the logical product thereof will be "0". The synthesizing unit 121 outputs a synthesized waveform signal 124 obtained by calculating the logical product of amplitudes of time-domain waveforms at each time.

The shaping unit 122 shapes the time-domain waveform signal 67 which is output from the IFFT unit 8 on the basis of the synthesized waveform signal 124 received. The shaping unit 122 extracts only a waveform which is in the time zone including no aliasing waveform from within a waveform signal which has been shaped and outputs a shaped waveform signal 125.

The FFT unit 123 performs FFT processing on the received shaped waveform signal 125. The FFT unit 123 outputs an interpolated pilot signal 126 that has been interpolated in the frequency axis direction by FFT processing. The shaped waveform signal 125 includes neither aliasing waveform nor noise. Thus, the interpolated pilot signal 126 that has been interpolated in the frequency axis direction exhibits a value which is further reduced in noise component to be suitably used as a reference value in propagation path compensation. As a result, the propagation path compensation unit 4 is allowed to perform propagation path compensation which is higher in accuracy by using the interpolated pilot signal 126 as a reference value.

Figure 18:
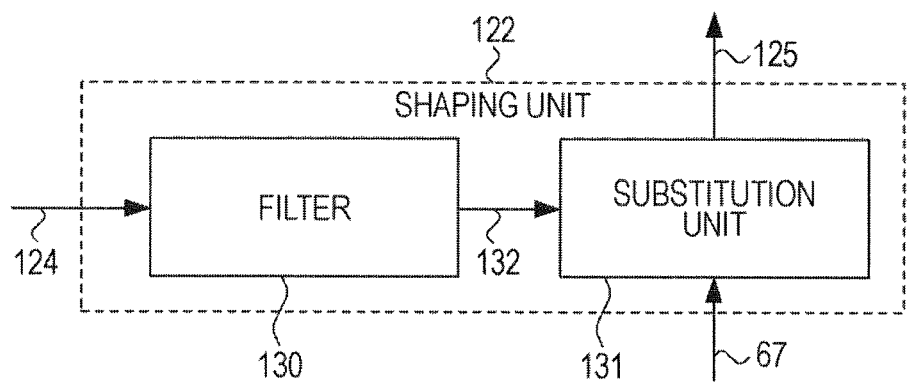
FIG. 18 is a detailed diagram illustrating an example of a shaping unit.

FIG. 18 is a detailed block diagram illustrating an example of the shaping unit 122. The shaping unit 122 includes a filter 130 and a substitution unit 131. The filter 130 extracts only a synthesized waveform which is in a fixed time zone from within the received synthesized waveform signal 124 and outputs an extracted waveform signal 132. The filter 130 extracts the synthesized waveform signal, for example, which is in a time zone ranging from (−a) μs to (336−a) μs. The value of "−a" is determined, for example, on the basis of a result of autocorrelation arithmetic processing performed using the matched filter type estimator 10. In this embodiment, the value of "a" is 84 μs (a=84 μs).

The substitution unit 131 processes the time-domain waveform signal 67 output from the IFFT unit 8 on the basis of the extracted waveform signal 132. The substitution unit 131 adds up the amplitude of the extracted waveform signal 132 and the amplitude of the time-domain waveform signal 67 which are obtained at each time. The substitution unit 131 outputs a result of adding-up as the shaped waveform signal 125. In the extracted waveform signal 132, the amplitude value obtained at a time that a multipath signal is present is "1" and the amplitude values other than the above are "0 s". Thus, it may become possible to extract only the amplitude obtained at the time that the multipath signal is present from within the time-domain waveform signal 67 by adding up the extracted waveform signal 132 onto the time-domain waveform signal 67.

Figure 19:
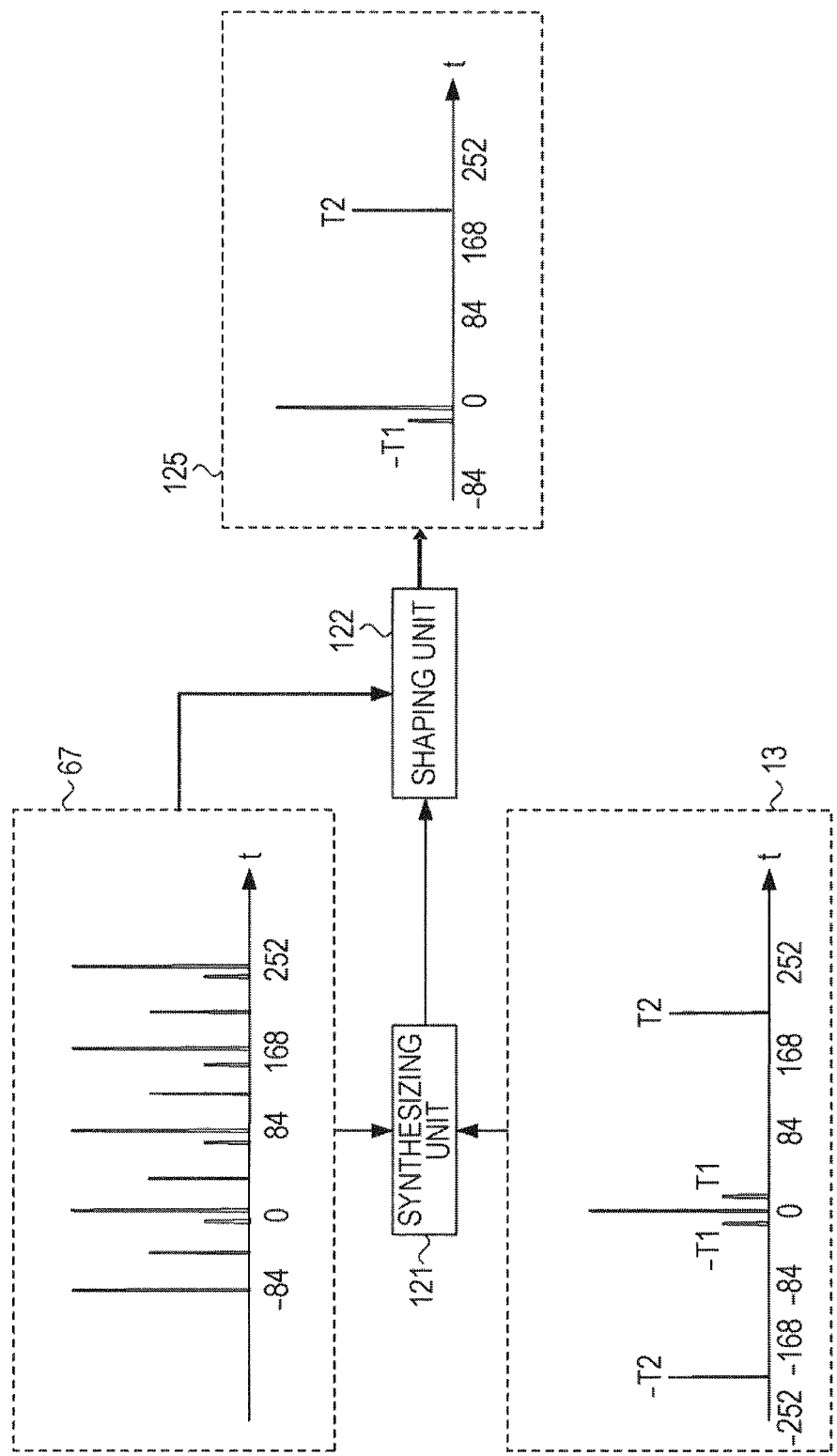
FIG. 19 is a diagram illustrating an example of shaping of a time-domain waveform signal that a frequency direction interpolation unit performs.

FIG. 19 is a diagram illustrating an example of shaping of a time-domain waveform signal performed using the frequency direction interpolation unit 7b. The time-domain waveform signal 67 illustrated in FIG. 19 corresponds to the time-domain waveform signal 67 output from the IFFT unit 8. For example, in the mode 3 of the ISDB-T, when the carrier interval K is 12 (K=12), the maximum analysis range reaches 84 μs which is ¹⁄₁₂ the value (1008 μs) of the effective symbol length. Thus, the time-domain waveform signal 67 exhibits a waveform in which aliasing generates every 84 μs. The time axis of the time-domain waveform signal 12 ranges from −84 μs to 252 μs.

The time-domain waveform signal 13 illustrated in FIG. 19 is output from the matched filter type estimator 10 as a signal indicating a result of autocorrelation arithmetic processing performed. In the time-domain waveform signal 13 which is output from the matched filter type estimator 10, there is no difference between plus and minus delay amount values (the values are equal to each other in the plus and minus time axis directions) and hence the time-domain waveform signal 13 exhibits a symmetric form centering on a time 0 μs. The time-domain waveform signal 13 has impulse waveforms at times −T2, −T1, 0, T1 and T2. The time axis of the time-domain waveform signal 13 ranges from −252 μs to 252 μs.

A shaped waveform signal 125 illustrated in FIG. 19 is obtained by shaping a result of synthesizing of the time-domain waveform signal 67 with the time-domain waveform signal 13 using the synthesizing unit 121 on the basis of the time-domain waveform signal 67 using the shaping unit 122. In the shaped waveform signal 125, the times −T1, 0 and T2 at which the impulse waveforms are present are equal to times at which impulse waveforms are present both in the time-domain waveform signal 67 and the time-domain waveform signal 13. The amplitude of each impulse waveform in the shaped waveform signal 125 is equal to that of the time-domain waveform signal 67 which is obtained at each time. Thus, it may become possible to extract an impulse waveform in which a relation between plus and minus delay time values is considered and which is free from influence of aliasing by synthesizing the time-domain waveform signal 67 obtained by taking a relation between plus and minus delay time values into consideration with the time-domain waveform signal 13 which is free from influence of aliasing using the synthesizing unit 121. Then, it may become possible to obtain path delay information covering a wider time zone with accuracy by performing FFT processing on the impulse waveform so extracted. In addition, it may become possible to obtain with accuracy the amplitude of the impulse waveform so extracted at a time that each impulse waveform so extracted has generated by shaping the waveform on the basis of the time-domain waveform signal 67 using the shaping unit 122.

Figure 20:
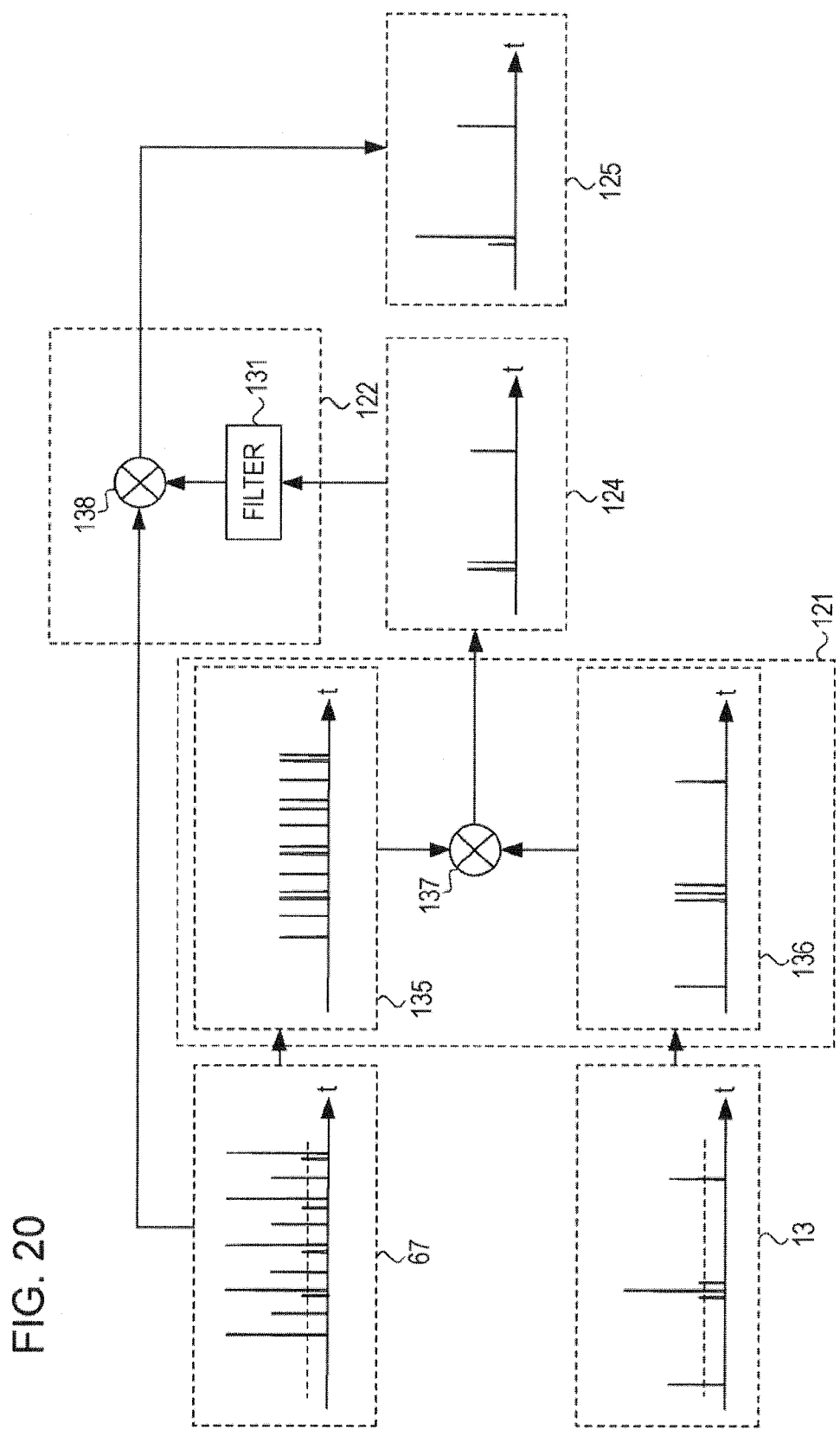
FIG. 20 is a diagram illustrating an example of detailed steps of waveform synthesizing and waveform shaping processes together with time-domain waveform signals.

FIG. 20 is a diagram illustrating an example of detailed steps of waveform synthesizing and waveform shaping together with time-domain waveform signals concerned. In the example illustrated in FIG. 20, the same numerals are assigned to the same members as those illustrated in FIG. 19 and description thereof will be omitted. In the example illustrated in FIG. 20, a time-domain waveform signal 135 is obtained by comparing the amplitude of the time-domain waveform signal 67 with a fixed threshold value and normalizing the amplitude which is larger than the threshold value to "1" and the amplitude which is smaller than the threshold value to "0". A time-domain waveform signal 136 is obtained by comparing the amplitude of the time-domain waveform signal 13 with a fixed threshold value and normalizing the amplitude which is larger than the threshold value to "1" and the amplitude which is smaller than the threshold value to "0". An integrating unit 137 calculates a logical product of two inputs. The synthesizing unit 121 adds up amplitude values of the time-domain waveform signal 135 and the time-domain waveform signal 136 that have been normalized at respective times using the integrating unit 137 and outputs a result of adding-up as a synthesized waveform signal 124.

The synthesized waveform signal 124 that has been output from the synthesis unit 121 is input into the shaping unit 122. A filter 131 in the shaping unit 122 extracts an impulse waveform which is in a fixed time zone from within the synthesized waveform signal 124 and normalizes the amplitudes of waveforms in time zones other than the above to zeros. An integrating unit 138 adds up a time-domain waveform signal output from the filter 131 and the time-domain waveform signal 67. Since the amplitude value of the synthesized waveform signal 124 is "1", the shaped waveform signal 125 output from the integrating unit 138 exhibits a waveform which has the amplitude value of the time-domain waveform signal 67 at a time that the amplitude value of the synthesized waveform signal 124 is "1". As described above, the frequency direction interpolation unit 7b is allowed to extract the impulse waveform in which a relation between plus and minus delay time values is considered and which is free from influence of aliasing. The receiving device 20b is allowed to perform accurate propagation path compensation on the basis of path delay information covering a wider time zone by extracting the impulse waveform in the above mentioned manner.

Figure 21:
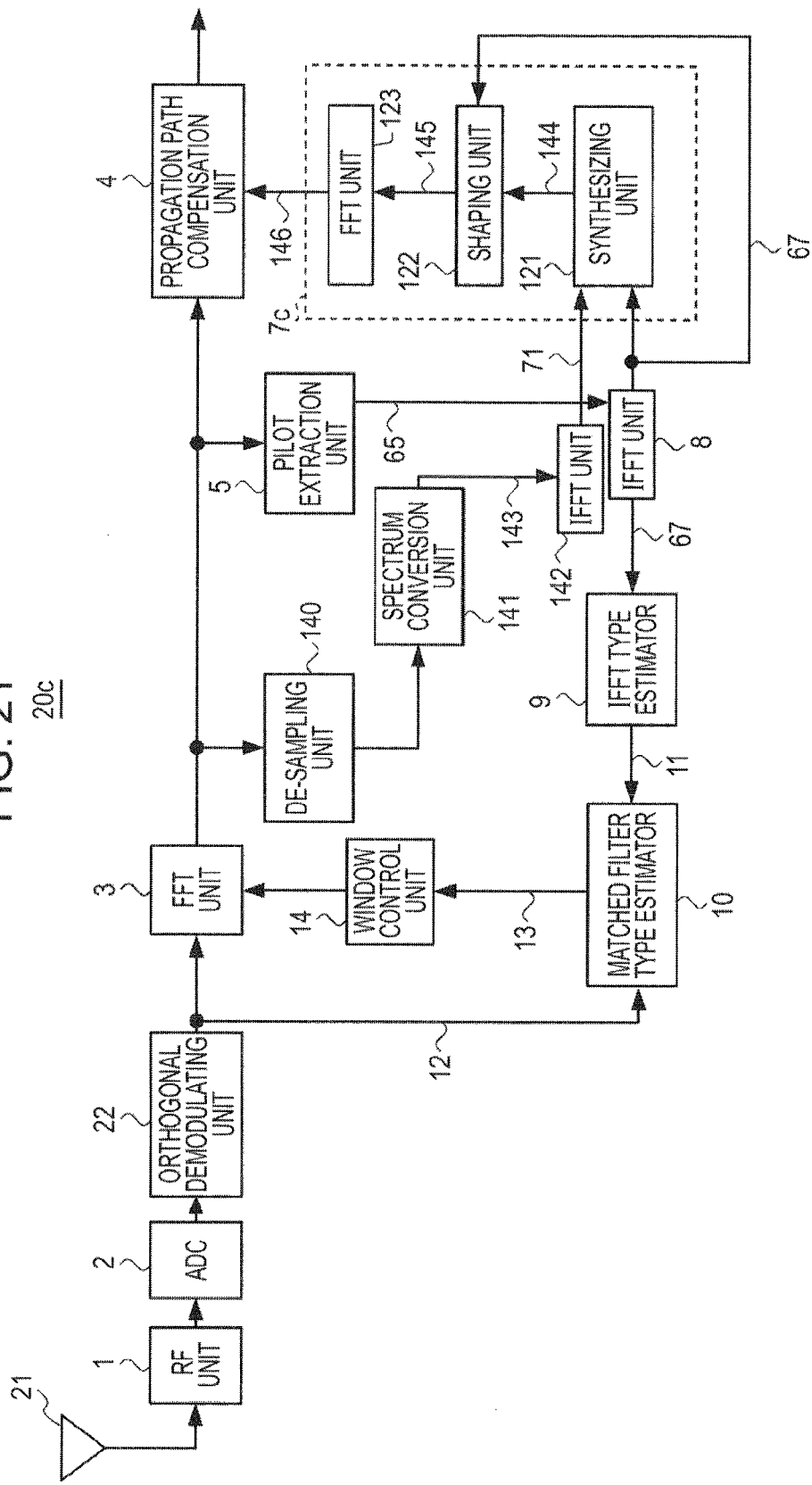
FIG. 21 is a block diagram of an example of a receiving device illustrating in detail an example of a frequency direction interpolation unit.

FIG. 21 is a block diagram of an example of a receiving device 20c, illustrating in detail an embodiment of the frequency direction interpolation unit 7 illustrated in FIG. 1. In the example in FIG. 21, the same numerals are assigned to the same members as those in FIG. 17 and description thereof will be omitted.

In the example in FIG. 21, the receiving device 20c differs from the receiving device 20b in FIG. 17 in that it includes a de-sampling unit 140, a spectrum conversion unit 141 and an IFFT unit 142. The de-sampling unit 140 extracts pilot signals at an arbitrary carrier interval from within a received signal that has been converted to a frequency domain signal using the FFT unit 3. Incidentally, in the above mentioned case, data signals may be extracted together with the pilot signals. The spectrum conversion unit 141 calculates the power on the basis of the real part and the imaginary part of the input received signal. In the embodiment illustrated in FIG. 21, the power of the received signal that the receiving device 20 receives is constant in sending independently of its frequency. Thus, in the case that the signal receiving condition is not changed, that is, for example, when a signal is propagated from a sending device to the receiving device 20c through one propagation path and the receiving device 20c is not moving, the amplitude of the power of an ideal received signal becomes constant independently of its frequency. Thus, a frequency direction interpolation unit 7c is allowed to perform interpolation arithmetic processing in which the state of the propagation path is considered by analyzing a change in power amplitude of the received signal. Incidentally, a phase component of the received signal per extracted frequency is eliminated by calculating the power.

The IFFT unit 142 performs IFFT arithmetic processing on the received signal that has been converted to the power value using the spectrum conversion unit 141. The power value input into the IFFT unit includes no phase information and hence the time-domain waveform signal which has been subjected to IFFT arithmetic processing exhibits a symmetric form in plus and minus time axis directions centering on the time 0.

The frequency direction interpolation unit 7c interpolates a pilot signal 65 which has been extracted using the pilot extraction unit 5 in the frequency axis direction on the basis of the received signal so de-sampled and converted to the power value. The frequency direction interpolation unit 7c includes the synthesizing unit 121, the shaping unit 122 and the FFT unit 123 as in the case of the frequency direction interpolation unit 7b.

The synthesizing unit 121 illustrated in FIG. 21 substitutes the value of each of the amplitudes of the time-domain waveform signal 67 output from the IFFT unit 8 and a time-domain waveform signal 71 output from the IFFT unit 142 to "1" or "0" on the basis of a fixed threshold value as a reference. For example, the synthesizing unit 121 substitutes the amplitude value which is larger than the threshold value to "1" and the amplitude value which is smaller than the threshold value to "0". The synthesizing unit 121 calculates the logical product of the amplitude values of time-domain waveform signals so substituted at each time. That is, if each of the amplitude values of two time-domain waveform signals which are obtained at the same time is "1", the logical product thereof will be "1". On the other hand, if one of the amplitude values of two time-domain waveform signals which are obtained at the same time is "0", the logical product thereof will be "0". The synthesizing unit 121 illustrated in FIG. 21 outputs a synthesized waveform signal 144 obtained by calculating the logical product of the amplitudes of the time-domain waveform signals at each time.

The shaping unit 122 illustrated in FIG. 21 shapes the waveform of the time-domain waveform signal 67 output from the IFFT unit 8 on the basis of a received synthesized waveform signal 144. The shaping unit 122 illustrated in FIG. 21 extracts only a waveform which is in a time zone including no aliased waveform from within the shaped waveform signal and outputs a shaped waveform signal 145.

The FFT unit 123 illustrated in FIG. 21 performs FFT processing on the received shaped waveform signal 145. The FFT unit 123 illustrated in FIG. 21 outputs an interpolated pilot signal 146 that has been interpolated in the frequency axis direction by being subjected to FFT processing. The shaped waveform signal 145 includes neither aliasing waveform nor noise, so that the interpolated pilot signal 146 so interpolated in the frequency axis direction exhibits a value which is further reduced in noise component to be desirably used as a reference value in propagation path compensation. Thus, the propagation path compensation unit 4 is allowed to perform highly accurate propagation path compensation by using the interpolated pilot signal 146 as a reference.

Figure 22:
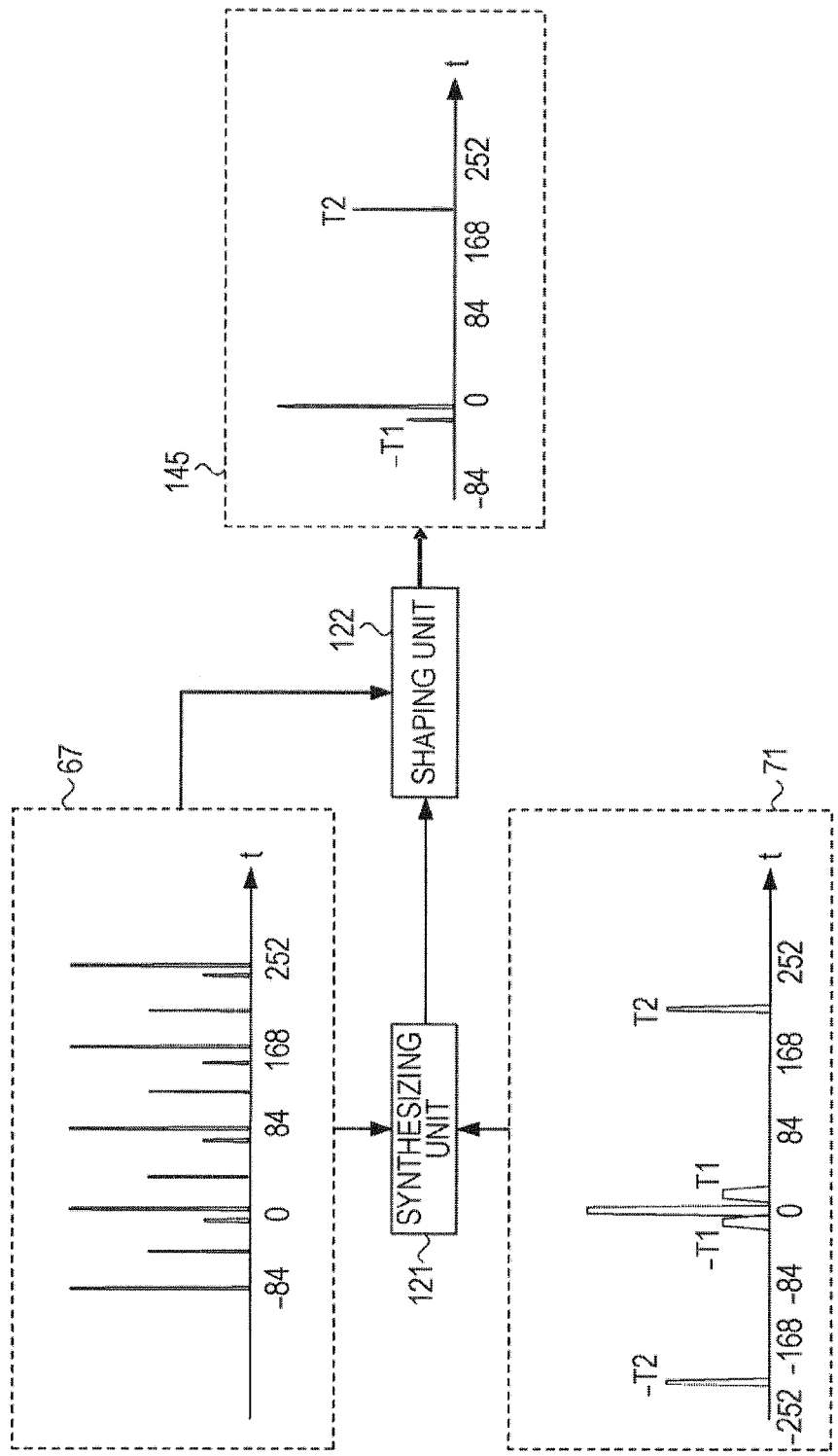
FIG. 22 is a diagram illustrating an example of waveform shaping that a frequency direction interpolation unit performs on time-domain waveform signals.

FIG. 22 is a diagram illustrating an example of waveform shaping of a time-domain waveform signal performed using the frequency direction interpolation unit 7c. The time-domain waveform signal 71 is a waveform signal which is output from the IFFT unit 142 after being subjected to IFFT arithmetic processing. The power value input into the IFFT unit 142 does not include any phase component, so that a time-domain waveform signal which is output after being subjected to IFFT arithmetic processing exhibits a waveform indicating no difference between plus and minus delay amount values and hence the time-domain waveform signal 71 exhibits a linearly symmetric form centering on the time 0 μs. The time-domain waveform signal 71 has impulse waveforms at the times −T2, −T1, 0, T1 and T2. The time axis of the time-domain waveform signal 71 ranges from −252 μs to 252 μs.

The shaped waveform signal 145 illustrated in FIG. 22 is obtained by shaping a result of synthesizing of the time-domain waveform signal 67 with the time-domain waveform signal 71 performed using the synthesizing unit 121 on the basis of the time-domain waveform signal 67 using the shaping unit 122. In the shaped waveform signal 145, the times −T1, 0 and T2 at which the impulse waveforms are present are equal to times at which impulse waveforms are present both in the time-domain waveform signal 67 and the time-domain waveform signal 71. The amplitude of each impulse waveform in the shaped waveform signal 145 is equal to that of the time-domain waveform signal 67 which is obtained at each time. It may become possible to extract an impulse waveform in which a relation between plus and minus delay time values is considered and which is free from influence of aliasing by synthesizing the time-domain waveform signal 67 which is obtained by taking a relation between plus and minus delay time values into consideration with the time-domain waveform signal 71 which is free from influence of aliasing using the synthesizing unit 121. Then, it may become possible to obtain path delay information covering a wider time zone with accuracy by performing FFT processing on the impulse waveform so extracted. In addition, it may become possible to obtain with accuracy the amplitude of the impulse waveform so extracted at a time that each impulse waveform has generated by shaping the waveform on the basis of the time-domain waveform signal 67 using the shaping unit 122.

Figure 23:
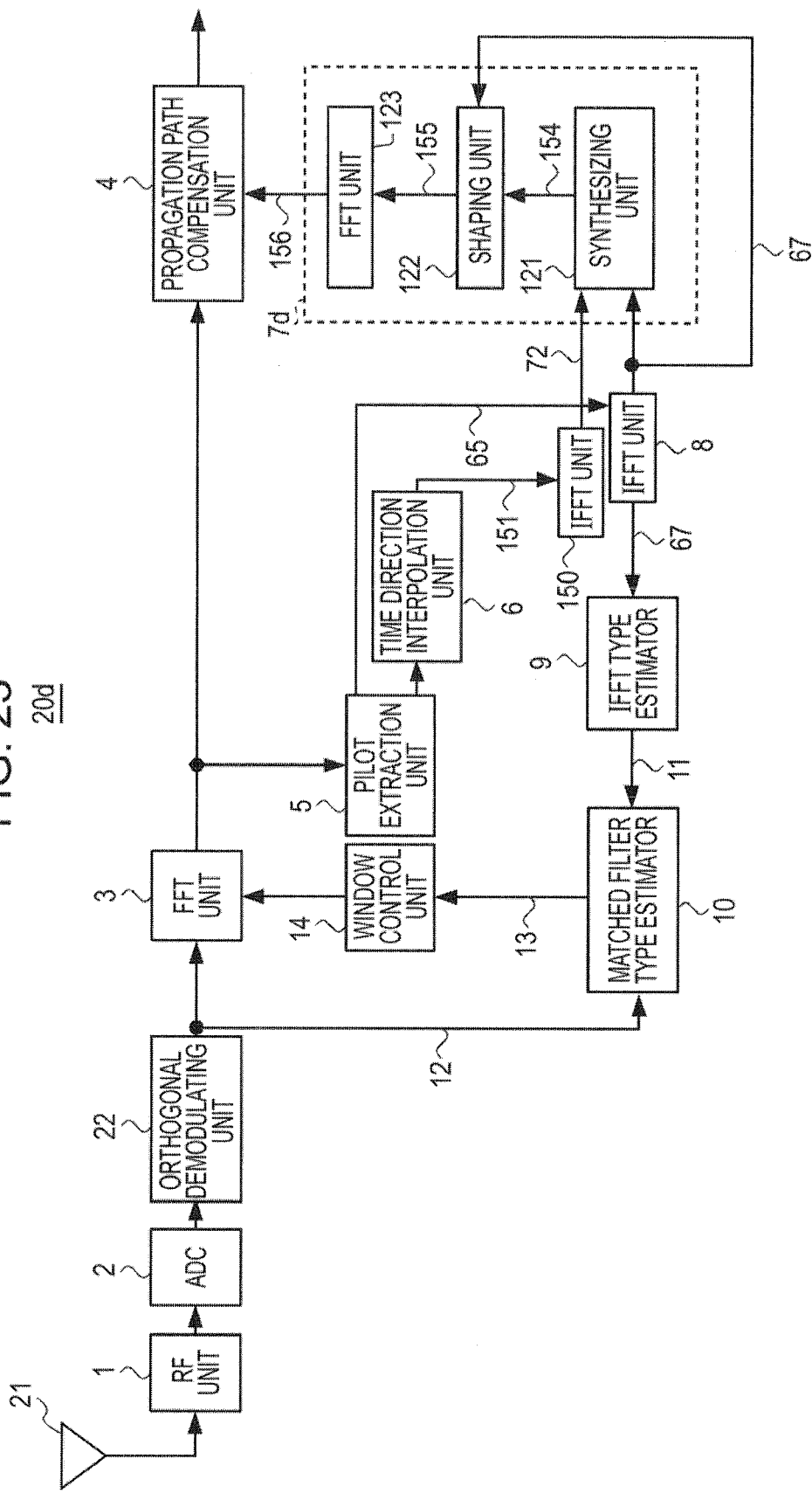
FIG. 23 is a block diagram of an example of a receiving device illustrating in detail an example of a frequency direction interpolation unit.

FIG. 23 is a block diagram of an example of a receiving device 20d illustrating in detail an embodiment of the frequency direction interpolation unit 7 illustrated in FIG. 1. In the example illustrated in FIG. 23, the same numerals are assigned to the same members as those illustrated in FIG. 17 and description thereof will be omitted.

In the example illustrated in FIG. 23, the receiving device 20d differs from the receiving device 20b illustrated in FIG. 17 in that it includes the time direction interpolation unit 6 and an IFFT unit 150. As described above, the time direction interpolation unit 6 performs interpolation arithmetic processing on the pilot signal which has been extracted using the pilot extraction unit 5 in the time axis direction. The time direction interpolation unit 6 outputs an interpolated signal 151 which has been subjected to interpolation arithmetic processing in the time axis direction to the IFFT unit 150. The IFFT unit 150 performs IFFT arithmetic processing on the interpolated signal 151. The IFFT unit 150 outputs a time-domain waveform signal 72.

The IFFT unit 150 is allowed to output the time-domain waveform signal 72 which is obtained when the carrier interval K=3 as described above by performing IFFT arithmetic processing on the basis of the pilot signals which have been subjected to interpolation arithmetic processing in the time axis direction. When the carrier interval K=3, the maximum analysis range reaches 336 μs which is one-third the value (1008 μs) of the effective symbol length. Thus, the time-domain waveform signal 72 exhibits a waveform in which aliasing occurs every 336 μs. In the embodiment illustrated in FIG. 23, the time domain of the time-domain waveform signal 72 ranges from −84 μs to 252 μs. Thus, it may become possible to obtain a time-domain waveform signal which is free from influence of aliasing by using the pilot signals which have been interpolated in the time axis direction such that the pilot signals are present every three carriers (the carrier interval K=3). In addition, since the pilot signals which have been interpolated in the time axis direction include phase components, multipath signal detection in which a relation between plus and minus delay amount values is considered may be performed.

A frequency direction interpolation unit 7d interpolates the pilot signal 65 which has been extracted using the pilot extraction unit 5 in the frequency axis direction on the basis of the pilot signal 151 so subjected to interpolation arithmetic processing in the time axis direction. The frequency direction interpolation unit 7d includes the synthesizing unit 121, the shaping unit 122 and the FFT unit 123 as in the case of the frequency direction interpolation unit 7b.

The synthesizing unit 121 illustrated in FIG. 23 substitutes the value of each of the amplitudes of the time-domain waveform signal 67 output from the IFFT unit 8 and the time-domain waveform signal 72 output from the IFFT unit 150 to "1" or "0" on the basis of a fixed threshold value as a reference. For example, the synthesizing unit 121 substitutes the amplitude value which is larger than the threshold value to "1" and the amplitude value which is smaller than the threshold value to "0". The synthesizing unit 121 calculates a logical product of the substituted time-domain waveform signals at each time. That is, if the amplitude value of each of two time-domain waveform signals which are obtained at the same time is "1", the logical product thereof will be "1". On the other hand, if one of the amplitude values of two time-domain waveform signals which are obtained at the same time is "0", the logical product thereof will be "0". The synthesizing unit 121 illustrated in FIG. 23 outputs a synthesized waveform signal 154 obtained by calculating the logical product of the amplitudes of the time-domain waveform signals at each time.

The shaping unit 122 illustrated in FIG. 23 shapes the waveform of the time-domain waveform signal 67 output from the IFFT unit on the basis of the received synthesized waveform signal 154. The shaping unit 122 illustrated in FIG. 23 extracts only a waveform which is in a time zone including no aliasing waveform from within the waveform signal so shaped and outputs a shaped waveform signal 155.

The FFT unit 123 illustrated in FIG. 23 performs FFT processing on the received shaped waveform signal 155. The FFT unit 123 illustrated in FIG. 23 outputs an interpolated pilot signal 156 which has been interpolated in the frequency axis direction by being subjected to FFT processing. The shaped waveform signal 155 includes neither aliasing waveform nor noise, so that the interpolated pilot signal 156 so interpolated in the frequency axis direction exhibits a value which is further reduced in noise component to be desirably used as a reference value in propagation path compensation. Thus, the propagation path compensation unit 4 is allowed to perform highly accurate propagation path compensation by using the interpolated pilot signal 156 as a reference.

FIG. 24 is a diagram illustrating an example of waveform shaping of a time-domain waveform signal using the frequency direction interpolation unit 7d. The time-domain waveform signal 72 is a waveform signal which is output from the IFFT unit 150 after being subjected to IFFT arithmetic processing. A pilot signal 151 which has been subjected to interpolation arithmetic processing in the time axis direction and is input into the IFFT unit 150 includes a phase component, so that a time-domain waveform signal so subjected to IFFT arithmetic processing exhibits a waveform indicating a difference between plus and minus delay amount values (the values are different from each other in the plus and minus time axis directions) and hence the time-domain waveform signal 72 exhibits an asymmetric form centering on the time 0 μs. The time-domain waveform signal 72 has impulse waveforms at the times −T1, 0, T1 and T2. The time axis of the time-domain waveform signal 72 ranges from −84 μs to 252 μs.

The shaped waveform signal 155 illustrated in FIG. 24 is obtained by shaping a result of synthesizing of the time-domain waveform signal 67 with the time-domain waveform signal 72 using the synthesizing unit 121 on the basis of the time-domain waveform signal 67 using the shaping unit 122. In the shaped waveform signal 155, the times −T1, 0 and T2 at which the impulse waveforms are present are equal to times at which impulse waveforms are present both in the time-domain waveform signal 67 and the time-domain waveform signal 72. The amplitude of each impulse waveform in the shaped waveform signal 155 is equal to that of the time-domain waveform signal 67 which is obtained at each time. It may become possible to extract an impulse waveform in which a relation between plus and minus delay time values is considered and which is free from influence of aliasing by synthesizing the time-domain waveform signal 67 obtained by taking a relation between plus and minus delay time values into consideration with the time-domain waveform signal 72 which is free from influence of aliasing using the synthesizing unit 121. Then, it may become possible to obtain path delay information covering a wider time zone with accuracy by performing FFT processing on the impulse waveform so extracted. In addition, it may become possible to obtain with accuracy the amplitude of the impulse waveform so extracted at a time that each impulse waveform has generated by shaping the waveform on the basis of the time-domain waveform signal 67 using the shaping unit 122.

Incidentally, in the case that multipath signal detection is performed on the basis of the pilot signal including a phase component as described in the explanation of the embodiment illustrated in FIG. 24, the timing at which the impulse waveform is generated in the signal obtained as a result of performance of IFFT arithmetic processing on the pilot signal which has been subjected to interpolation arithmetic processing in the time axis direction becomes the same as the timing at which the impulse waveform generates in the shaped waveform signal 155. Thus, the shaping unit 122 may be eliminated by substituting only the amplitude of the time-domain waveform signal 72 to "1" or "0" on the basis of a fixed threshold value as a reference and synthesizing it with the time-domain waveform signal 67 using the synthesizing unit 121.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:
1. A receiving device comprising:
   a receiver that receives a frequency multiplex signal;
   a first Fourier transformation unit that transforms the received frequency multiplex signal to frequency domain signal on the basis of a window that specifies a time zone of Fourier transformation;
   a first time-domain waveform generator that generates a first time-domain waveform by performing inverse Fourier transformation of a plurality of pilot signals which are inserted into the frequency multiplex signal at fixed frequency intervals;
   a second time-domain waveform generator that generates a second time-domain waveform having an aliasing period which is longer than an aliasing period of the first time-domain waveform on the basis of the received frequency multiplex signal;
   a second Fourier transformation unit that synthesizes the first time-domain waveform to the second time-domain waveform and transforms the synthesized time-domain waveform to frequency-domain information; and a propagation-path compensation unit that compensates a propagation-path of the frequency multiplex signal which is output from the first Fourier transformation unit in accordance with information transformed by the second Fourier transformation unit.

2. The receiving device according to claim 1, wherein the second time-domain waveform generator generates the second time-domain waveform on the basis of a relation in magnitude between a threshold value which changes in accordance with the receiving sensitivity of the frequency multiplex signal and a calculated autocorrelation value of the frequency multiplex signal.

3. The receiving device according to claim 1, wherein the second time-domain waveform generator calculates the power value at each frequency of the frequency multiplex signal which has been output from the first Fourier transformation unit and generates the second time-domain waveform on the basis of the calculated power values.

4. The receiving device according to claim 1, wherein the second time-domain waveform generator interpolates the plurality of pilot signals in a time axis direction and generates the second time-domain waveform from inverse Fourier transformation of the interpolated pilot signals.

5. A receiving device comprising:
a receiver that receives a frequency multiplex signal;
a Fourier transformation unit that transforms the received frequency multiplex signal to a frequency domain signal on the basis of a window that specifies a time zone of Fourier transformation;
a first estimator that extracts a group of candidates of multipath signal for the frequency multiplex signal on the basis of a time-domain waveform generated by inverse Fourier transformation of a plurality of pilot signals inserted into the transformed frequency multiplex signal at a predetermined frequency interval;
a second estimator that extracts a multipath signal from the group of candidates of the multipath signal on the basis of a calculated autocorrelation value between the frequency multiplex signal and a frequency multiplex signal which is delayed in accordance with a pulse width and a pulse generation timing of the extracted candidate of the multipath signal; and
a window control unit that adjusts the timing of the window on the basis of the pulse generation timing of the extracted multipath signal.

6. The receiving device according to claim 5, wherein the first estimator generates a time-domain waveform from inverse Fourier transformation of a plurality of pilot signals generated by interpolation arithmetic processing in a time axis direction.

7. The receiving device according to claim 5, wherein the first estimator extracts the group of signals of the multipath signal candidates on the basis of a time-domain waveform shifted for integral multiples of a maximum analysis range for performing inverse Fourier transformation on the plurality of pilot signals.

8. The receiving device according to claim 5, wherein the first estimator extracts the group of signals of the multipath signal candidates on the basis of a time-domain waveform obtained by synthesizing a first time-domain waveform generated by inverse Fourier transformation of the plurality of pilot signals with a second time-domain waveform generated by inverse Fourier transformation of a plurality of pilot signals generated by interpolation in the time axis direction.

9. The receiving device according to claim 5, wherein the second estimator extracts the multipath signal on the basis of a relation in magnitude between a threshold value which changes in accordance with the receiving sensitivity of the frequency multiplex signal and the autocorrelation arithmetic value.

10. A receiving method executed by a receiving device, comprising:
receiving a frequency multiplex signal by the receiving device;
transforming, by the receiving device, the received frequency multiplex signal to a frequency domain signal on the basis of a window that specifies a time zone of Fourier transformation;
extracting, by the receiving device, a group of signals of multipath signal candidates for the frequency multiplex signal on the basis of a time-domain waveform generated by inverse Fourier transformation of a plurality of pilot signals inserted into the transformed frequency multiplex signal at a predetermined frequency interval;
extracting, by the receiving device, a multipath signal from the group of signals of the multipath signal candidates on the basis of an autocorrelation arithmetic value between the frequency multiplex signal and a frequency multiplex signal which is delayed in accordance with a pulse width and a pulse generation timing of the extracted multipath signal candidate; and
adjusting, by the receiving device, the timing of the window on the basis of the pulse generation timing of the extracted multipath signal appearing.

11. The receiving method according to claim 10, wherein information on the multipath signal candidates is extracted on the basis of a time-domain waveform generated by inverse Fourier transformation of a plurality of pilot signals generated by interpolation arithmetic processing in a time axis direction.

12. The receiving method according to claim 10, wherein information on the multipath signal candidates is extracted on the basis of a time-domain waveform shifted for integral multiples of a maximum analysis range for performing inverse Fourier transformation of the plurality of pilot signals.

* * * * *